US012481831B2

(12) United States Patent
Kosaka

(10) Patent No.: US 12,481,831 B2
(45) Date of Patent: Nov. 25, 2025

(54) INFORMATION PROCESSING APPARATUS, INFORMATION PROCESSING METHOD, STORAGE MEDIUM, AND LEARNING APPARATUS

(71) Applicant: CANON KABUSHIKI KAISHA, Tokyo (JP)

(72) Inventor: Ryo Kosaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 728 days.

(21) Appl. No.: 17/940,102

(22) Filed: Sep. 8, 2022

(65) Prior Publication Data
US 2023/0083959 A1 Mar. 16, 2023

(30) Foreign Application Priority Data
Sep. 13, 2021 (JP) .................. 2021-148490

(51) Int. Cl.
*G06F 40/30* (2020.01)
*G06N 20/00* (2019.01)

(52) U.S. Cl.
CPC ............. *G06F 40/30* (2020.01); *G06N 20/00* (2019.01)

(58) Field of Classification Search
CPC ........ G06F 40/30; G06N 20/00; G06N 3/045; G06V 30/40
See application file for complete search history.

(56) References Cited

U.S. PATENT DOCUMENTS

2023/0065915 A1\* 3/2023 Berestovsky ...... G06V 30/1448

FOREIGN PATENT DOCUMENTS

JP 2016051339 A 4/2016

OTHER PUBLICATIONS

D. Trier et al. "Feature Extraction Methods for Character Recognition—A Survey", A Pattern Recognition, vol. 29, No. 4, pp. 641-662, 1996, . (Year: 1996).\*

\* cited by examiner

*Primary Examiner* — Mekonen T Bekele
(74) *Attorney, Agent, or Firm* — ROSSI, KIMMS & McDOWELL LLP

(57) ABSTRACT

Provided is an information processing apparatus that extracts a character string to be a candidate of an item value corresponding to a predetermined item, from among multiple character strings included in a document image to be processed. The information processing apparatus first obtains information indicating a conceptual feature group of a preset extraction target, then identifies a conceptual feature group to which each of the character strings included in the document image to be processed belongs from among predetermined multiple conceptual feature groups based on a feature vector corresponding to each character string, and then extracts the character string whose identified conceptual feature group is the same as the conceptual feature group associated with the same attribute information as the conceptual feature group of the extraction target, from among the character strings included in the document image, as the candidate.

24 Claims, 28 Drawing Sheets

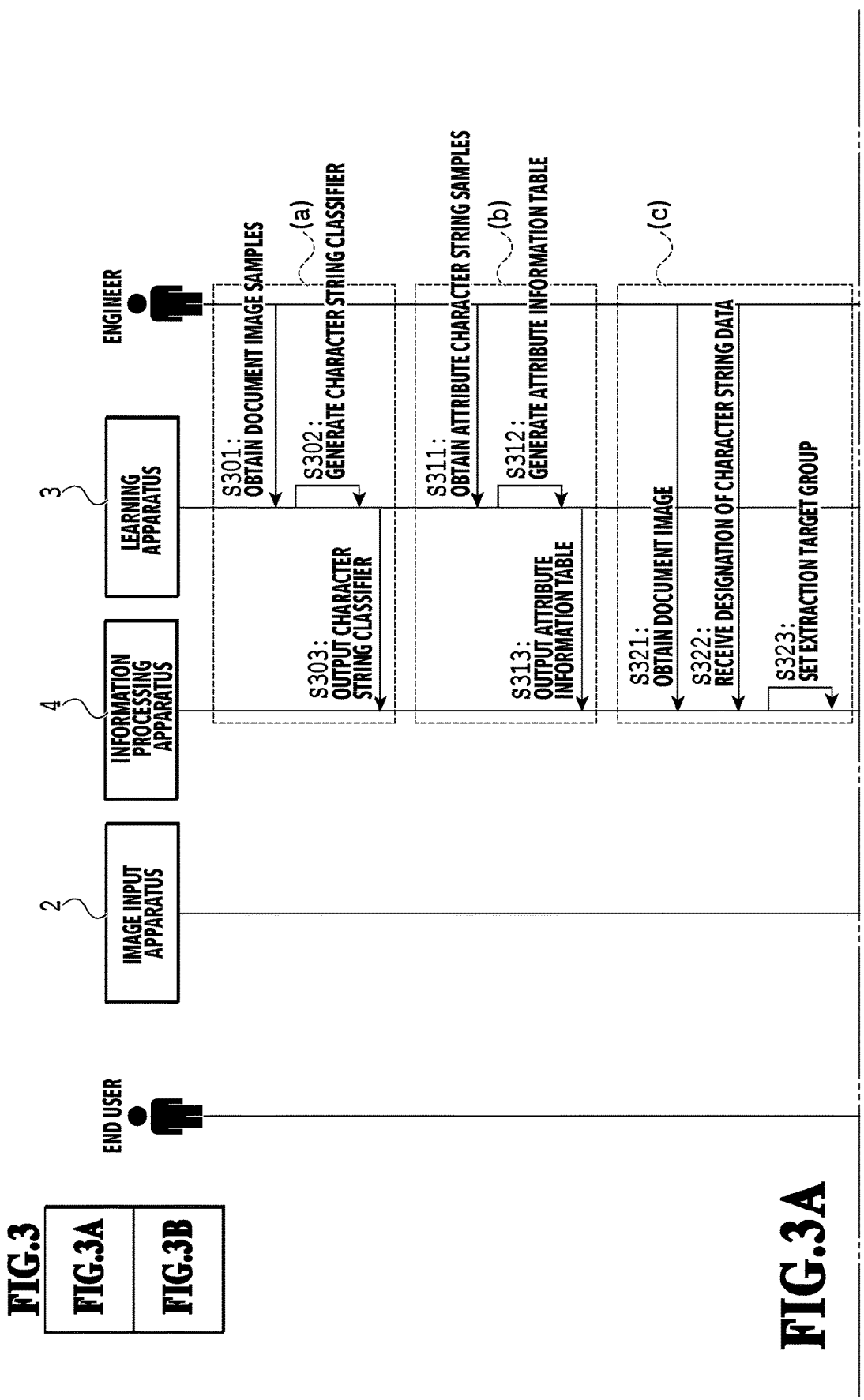

| ATTRIBUTE GROUP | SAMPLES OF CHARACTER STRING DATA | | | | | |
|---|---|---|---|---|---|---|
| | PERSONAL NAME (801) | ADDRESS (802) | DATE (803) | CORPORATION NAME (804) | MEDICAL INSTITUTION NAME (805) | PRODUCT NAME (806) |
| | YUKAWA AIRI | X-X-X, OHMINE, AKIRUNO-SHI, TOKYO | 2012/06/18 | KOMINE INDUSTRIES K.K. | AKIRUNO MEDICAL CLINIC | BEEF |
| | IRIE SHOKICHI | Y-YY-Y, NAKAZOE-CHO, KAWACHINO-SHI, OSAKA | 2018.10.5 | OSAKA PAPER MILL | NAKAZOE RED CROSS HOSPITAL | TEA |
| | OKA YUKINO | Z-ZZ-ZZ, KAMII, ASUKA-MURA, TAKAICHI-GUN, NARA | MARCH 5, 1998 | NARA ELECTRICS | ASUKA CLINIC HOSPITAL | BALL-POINT PEN |
| | TSURUOKA NAO | XY-XYZ, CHABATAKE-CHO, SUGA-SHI, FUKUSHIMA | AUGUST 8, REIWA 2 | INAWASHIRO TRANSPORT | SUGA DERMATOLOGY HOSPITAL | RICE |
| | SAKANO TAKEHISA | XX-YY-Z-XYZ, EIFUKUJI-CHO, KOUCHI-SHI | 2018-12-23 | TOSA SECURITIES K.K. | KOCHI CITY UNIVERSITY HOSPITAL | NOTEBOOK |
| | HAMADA MORIHIKO | XY-ZZ, AOI-CHO, OBAMA-SHI, FUKUI | FEBRUARY 1, HEISEI 6 | OBAMA RESEARCH INSTITUTION | AOI DENTAL HOSPITAL | SAKE |
| | HAMA HISAKO | Y-Z-X, SEKIMOTONAKA, SEKIMOTO-CHO, MINAMIIBARAKI-SHI | 2019.04.25 | MITO SYSTEMS | SEKIMOTO INTERNAL MEDICINE HOSPITAL | JUICE |
| | ... | ... | ... | ... | ... | ... |

FIG.8A

| ATTRIBUTE GROUP | COMPANY NAME | | 811 |
|---|---|---|---|
| SAMPLES OF CHARACTER STRING DATA | KOMINE INDUSTRIES K.K. | AKIRUNO MEDICAL CLINIC | |
| | INAWASHIRO TRANSPORT | NAKAZOE RED CROSS HOSPITAL | |
| | TOSA SECURITIES K.K. | SEKIMOTO INTERNAL MEDICINE HOSPITAL | |
| | ... | ... | |

FIG.8B

| ATTRIBUTE GROUP | FOOD (821) | BEVERAGE (822) | ALCOHOL (823) | EXPENDABLES (824) |
|---|---|---|---|---|
| SAMPLES OF CHARACTER STRING DATA | BEEF | TEA | SAKE | BALL-POINT PEN |
| | RICE | JUICE | WINE | NOTEBOOK |
| | ... | ... | ... | ... |

FIG.8C

| CONCEPTUAL FEATURE GROUP | ATTRIBUTE INFORMATION | |
|---|---|---|
| 1111 | CORPORATION NAME | ~901 |
| 1112 | CORPORATION NAME | ~902 |
| 1113 | DATE | ~903 |
| 1114 | DATE | ~904 |
| 1115 | MEDICAL INSTITUTION NAME | ~905 |
| 1116 | MEDICAL INSTITUTION NAME | ~906 |
| 1117 | PRODUCT NAME | ~907 |
| ... | ... | |

FIG.9A

| CONCEPTUAL FEATURE GROUP | ATTRIBUTE INFORMATION | |
|---|---|---|
| 1111 | COMPANY NAME | ~911 |
| 1112 | COMPANY NAME | ~912 |
| 1113 | DATE | ~913 |
| 1114 | DATE | ~914 |
| 1115 | COMPANY NAME | ~915 |
| 1116 | COMPANY NAME | ~916 |
| 1117 | PRODUCT NAME | ~917 |
| ... | ... | |

FIG.9B

| CONCEPTUAL FEATURE GROUP | ATTRIBUTE INFORMATION | |
|---|---|---|
| 1111 | CORPORATION NAME | | 911
| 1112 | CORPORATION NAME | | 912
| 1113 | DATE | | 913
| 1114 | MEDICAL INSTITUTION NAME | | 914
| 1115 | MEDICAL INSTITUTION NAME | | 915
| 1116 | COMPANY NAME | | 916
| 1117 | BEVERAGE | ALCOHOL | 917
| ... | ... | ... |

FIG.9C

INFORMATION PROCESSING APPARATUS, INFORMATION PROCESSING METHOD, STORAGE MEDIUM, AND LEARNING APPARATUS

BACKGROUND

Field

The present disclosure relates to a technique of extracting data of a character string from a document image.

Description of the Related Art

There is performed an operation of extracting a predetermined item value as data of a character string from a document image obtained by using an image scanner device (hereinafter, referred to as "scanner"), a facsimile (hereinafter, referred to as "FAX") receiver, or the like. The extracted data of character string is used in a data input task or the like, as input data for a process of transcription to a business system, a document filing process such as automatic file name appending, or the like.

As a technique of assisting the data input task, Japanese Patent Laid-Open No. 2016-51339 discloses a method of extracting a character string corresponding to an item value from an image of a document that is generally referred to as a semi-fixed form document or a non-fixed form document and that is created in a layout different from that of a fixed form document whose layout is defined in advance. In the method (hereinafter, referred to as "conventional method") disclosed in Japanese Patent Laid-Open No. 2016-51339, first, a predetermined item name such as "account number" and an item value such as "1234567" corresponding to the item name are extracted from multiple character strings included in a document image of a transfer request form or the like. Next, validity of the item name and the item value is evaluated from a positional relationship between the item name and the item value and the item value is extracted based on a result of this evaluation. In the conventional method, the item name is extracted based on a predetermined keyword such as "number" or "account number" and the item value is extracted based on a predetermined data type such as "NNNNNNN" (N is, for example, an arbitrary Arabic numeral).

Moreover, there is a counting/analysis task in a journaling process in terms of the tax code or like. In this task, counting or analysis is performed based on extracted character strings, and pieces of data of character strings after the counting or analysis are inputted as pieces of new data. In order to perform this counting/analysis process, pieces of data of the extracted character strings need to be counted by being classified into appropriate attribute groups such as items of an account including expendables, transportation costs, and the like. However, in a conventional method, the counting is performed such that the user manually classifies the pieces of data based on his or her experience. Alternatively, the counting is performed such that a group name of each of attributes is determined from item values that are extracted data of character stings, based on information indicating relationships between item values and predetermined group names of attributes.

Although the conventional method can extract an item value of an item that is noted by a regular character string such as "money amount", "date", or "account number", the conventional method sometimes cannot extract an item value of an item that is noted by an irregular character string such as "personal name", "address", "occupation", or "relationship". Specifically, in the case where an item value is noted by a regular character string, validity can be evaluated by using a data type. However, in the case where an item value is noted by an irregular character string, evaluation of validity using a data type is difficult and a desired item value cannot be always extracted.

SUMMARY

An information processing apparatus according to the present disclosure is an information processing apparatus that extracts a candidate character string to be a candidate of an item value corresponding to a predetermined item, from among a plurality of character strings included in a document image to be processed, the information processing apparatus including: one or more hardware processors; and one or more memories storing one or more programs configured to be executed by the one or more hardware processors, the one or more programs including instructions for: obtaining information on a conceptual feature group of a preset extraction target among a predetermined plurality of conceptual feature groups; obtaining an attribute information table in which each of the plurality of conceptual feature groups is associated in advance with attribute information indicating items of attribute groups; obtaining one or more conceptual feature groups associated with the same attribute information as the attribute information associated with the conceptual feature group of the extraction target, from among the plurality of conceptual feature groups as a conceptual feature group set based on the attribute information table; identifying the conceptual feature group to which each of the plurality of character strings belongs from among the plurality of conceptual feature groups based on a feature vector corresponding to each of the plurality of character strings, and extracting the character string whose identified conceptual feature group is the same as any of the conceptual feature groups in the conceptual feature group set, from among the plurality of character strings as the candidate character string; and outputting the extracted candidate character string.

Further features of the present invention will become apparent from the following description of exemplary embodiments with reference to the attached drawings.

BRIEF DESCRIPTION OF THE DRAWINGS

FIG. 2A-1 is a block diagram illustrating an example of functional blocks included in an image input apparatus according to the first embodiment and FIG. 2A-2 is a block diagram illustrating an example of hardware included in the image input apparatus according to the first embodiment;

FIG. 2B-1 is a block diagram illustrating an example of functional blocks included in a learning apparatus according to the first embodiment and FIG. 2B-2 is a block diagram illustrating an example of hardware included in the learning apparatus according to the first embodiment;

FIG. 2C-1 is a block diagram illustrating an example of functional blocks included in an information processing apparatus according to the first embodiment and FIG. 2C-2 is a block diagram illustrating an example of hardware included in the information processing apparatus according to the first embodiment;

FIG. 3 is a diagram showing the relationship between FIGS. 3A and 3B;

FIGS. 3A and 3B are sequence diagrams illustrating an example of a processing sequence of the information processing system according to the first embodiment;

FIGS. 8A, 8B, and 8C are explanatory diagrams for explaining examples of attribute character string samples;

FIGS. 9A, 9B, and 9C are explanatory diagrams for explaining examples of an attribute information table;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

<Information Processing System>

Figure 1:
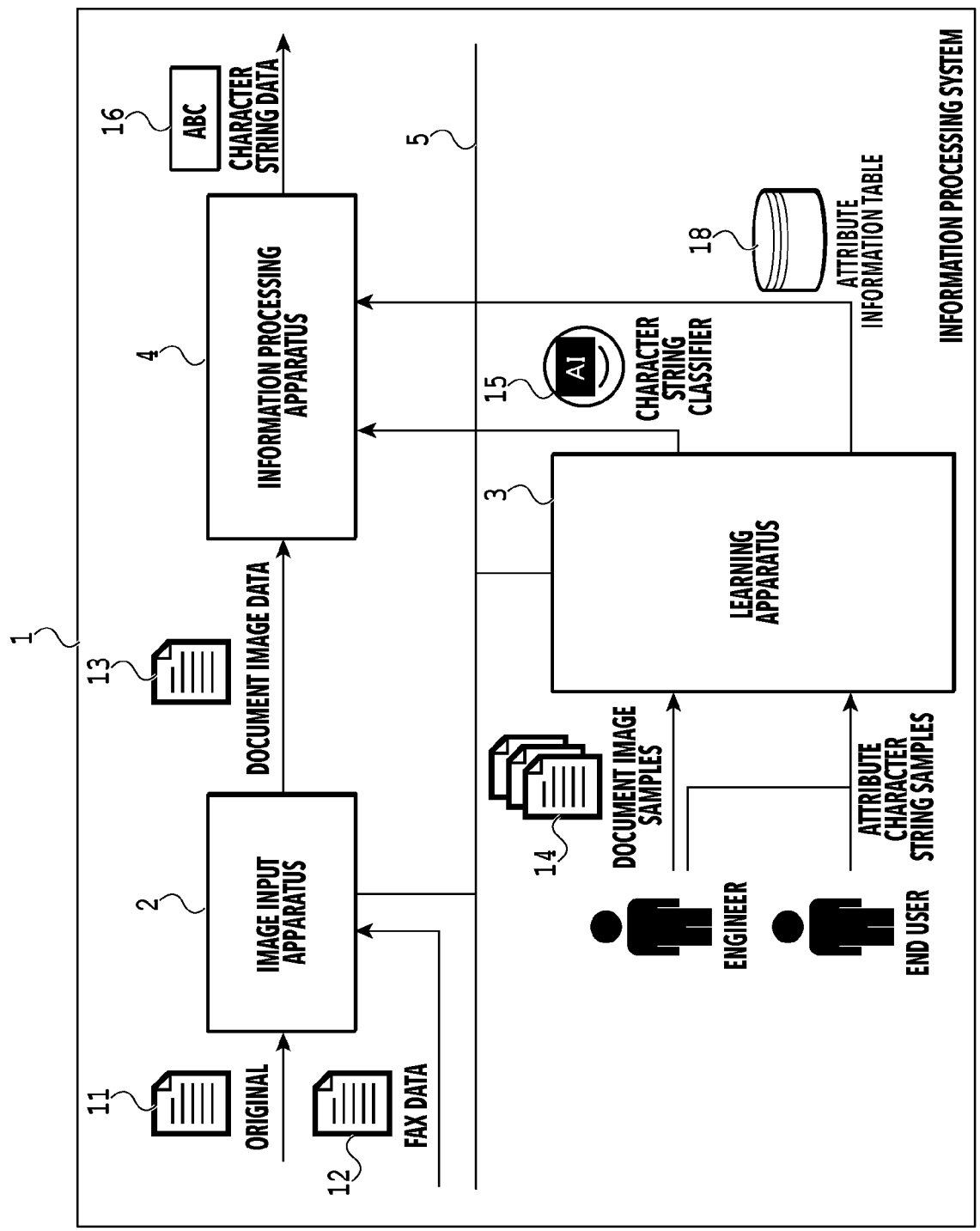
FIG. 1 is a block diagram illustrating an example of a configuration of an information processing system according to a first embodiment.

An information processing system 1 according to a first embodiment is described with reference to FIGS. 1 to 9C and FIGS. 11A to 14B. FIG. 1 is a block diagram illustrating an example of a configuration of the information processing system 1 according to the first embodiment. The information processing system 1 includes an image input apparatus 2, a learning apparatus 3, and an information processing apparatus 4. Moreover, the image input apparatus 2, the learning apparatus 3, and the information processing apparatus 4 are coupled to be capable of communicating with one another via a network 5. In the information processing system 1, not one but multiple image input apparatuses 2, multiple learning apparatuses 3, or multiple information processing apparatuses 4 may be coupled to the network 5. Specifically, for example, the configuration may be such that the information processing apparatus 4 is formed of a first apparatus that has high-speed computation resources and a second apparatus that has a high-capacity storage and the first and second apparatuses are coupled to be capable of communicating with each other via the network 5. The information processing system 1 illustrated in FIG. 1 is a system in which one image input apparatus 2, one learning apparatus 3, and one information processing apparatus 4 are coupled to the network 5 as an example.

The image input apparatus 2 is achieved by, for example, a multi-function peripheral (MFP) having multiple functions such as a print function, a scan function, and a FAX function. The image input apparatus 2 has a function of obtaining an image and outputting data of the obtained image to an external apparatus. In the case where the image input apparatus 2 is achieved by the MFP, for example, the image input apparatus 2 obtains a document image 13 by optically scanning an original 11 printed on a printing medium such as paper by using the scan function and performing a well-known scan image process. Moreover, in this case, for example, the image input apparatus 2 obtains the document image 13 by receiving FAX data 12 transmitted from a FAX transmitter not illustrated in FIG. 1 by using the FAX function and performing a well-known FAX image process on the FAX data 12. Furthermore, the image input apparatus 2 transmits the obtained document image 13 to the information processing apparatus 4 as document image data.

Note that the MFP is merely an example and the image input apparatus 2 may be achieved by a personal computer (PC) or the like. Specifically, for example, the image input apparatus 2 may obtain the document image 13 generated by using a document creation application operating in a PC used as the image input apparatus 2 and transmit the obtained document image 13 to the information processing apparatus 4 as the document image data. In this case, the data of the document image 13 generated by using the document creation application is, for example, data in an electronic document file format such as a Portable Document Format (PDF). The data of the document image 13 may be data such as still image data of Joint Photographic Experts Group (JPEG) or the like.

The learning apparatus 3 generates and outputs a character string classifier 15. Specifically, the learning apparatus 3 performs machine learning and generates the character string classifier 15 based on a learned model obtained by performing the machine learning. In this case, the character string classifier 15 is a classifier for identifying which one of predetermined multiple groups capturing conceptual features (hereinafter, referred to as "conceptual feature groups") a character string inputted as an explanatory variable belongs to, based on information indicating the character string. Specifically, the learning apparatus 3 first obtains data of character strings (hereinafter, referred to as "character string data") included in multiple samples of document images (hereinafter, referred to as "document image samples 14") provided by a user such as an engineer.

Next, the learning apparatus 3 generates the character string classifier 15 based on a learned model obtained by performing machine learning while using the obtained character string data as data for learning. In this case, the conceptual feature group refers to a group capturing conceptual features of the character string data generally referred to as named entity and examples thereof include proper nouns such as personal names and names of places and named entities such as date and amount of money. Note that the learning apparatus 3 may convert the obtained character string data to a feature vector and perform the machine learning by using the converted feature vector as the data for learning. The feature vector is to be described later.

The learning apparatus 3 obtains, for example, multiple pieces of data of document images handled in a human resource back office, as the document image samples 14. The learning apparatus 3 groups character strings included in each of the obtained multiple document image samples 14 into multiple conceptual feature groups corresponding to document name, date, personal name, address, corporate name, and the like by performing machine learning, based on data of the character strings. The learning apparatus 3 thereby generates the character string classifier 15 for identifying which one of the aforementioned attribute groups a character string inputted as an explanatory variable belongs to, based on data indicating the character string. Note that the character strings included in the document image samples 14 are obtained as a character recognition result acquired by executing an optical character recognition (OCR) process on the document image samples 14.

Moreover, the learning apparatus 3 may obtain, for example, multiple pieces of data of document images handled in a medical back office, as the document image samples 14. In this case, the learning apparatus 3 groups character strings included in each of the obtained multiple document image samples 14 into multiple conceptual feature groups corresponding to document name, date, personal name, medical institution name, disease name, medicine name, amount of money, and the like by performing machine learning, based on data of the character strings. The learning apparatus 3 thereby generates the character string classifier 15 for identifying which one of the aforementioned conceptual feature groups an inputted character string belongs to, based on data indicating the inputted character string. After the generation of the character string classifier 15, the learning apparatus 3 transmits the generated character string classifier 15 to the information processing apparatus 4 via the network 5.

Moreover, the learning apparatus 3 generates and outputs an attribute information table 18 in addition to the character string classifier 15. Specifically, the learning apparatus 3 first obtains attribute character string samples 17 provided by a user such as an engineer or an end user (hereinafter, simply referred to as "user") and obtains attribute information and character string data included in each of the attribute character string samples 17. Next, the learning apparatus 3 classifies the character string data included in the attribute character string sample 17 into one of the conceptual feature groups by using the aforementioned character string classifier 15 generated in the learning apparatus 3 and associates the conceptual feature group and the attribute information with each other to generate the attribute information table 18. After the generation of the attribute information table 18, the learning apparatus 3 transmits the generated attribute information table 18 to the information processing apparatus 4 via the network 5. Details of the learning apparatus 3 are described later.

The information processing apparatus 4 obtains one or more pieces of data corresponding respectively to character strings included in the document image 13 received from the image input apparatus 2, as the character string data for each character string. Specifically, for example, the information processing apparatus 4 obtains the character recognition result acquired by executing the OCR process on the document image 13 as the character string data. Then, the information processing apparatus 4 extracts one or more pieces of data of character strings to be a candidate (hereinafter, referred to as "candidate character strings") from among the one or more pieces of data of character strings included in the document image 13. Specifically, the information processing apparatus 4 first uses the character string classifier 15 to identify which one of the multiple conceptual feature groups the character string of each piece of obtained character string data belongs to. Next, the information processing apparatus 4 extracts character string data 16 whose identified conceptual feature group is the same as a conceptual feature group of a predetermined extraction target (hereinafter, referred to as "extraction target group"), from among the one or more pieces of data of character strings included in the document image 13, as data of the candidate character string. The information processing apparatus 4 outputs the extracted data of candidate character string (character string data 16). Specifically, the information processing apparatus 4 outputs the extracted data of candidate character string (character string data 16) to a storage device, a display device, or the like not illustrated in FIG. 1. Details of the information processing apparatus 4 are described later.

The network 5 is a communication network formed of a local area network (LAN), a wide area network (WAN), or the like. The network 5 couples the image input apparatus 2, the learning apparatus 3, and the information processing apparatus 4 to allow communication among these apparatuses and enables exchange of data among these apparatuses.

<Apparatus Configurations>

Figures 1, 2A:
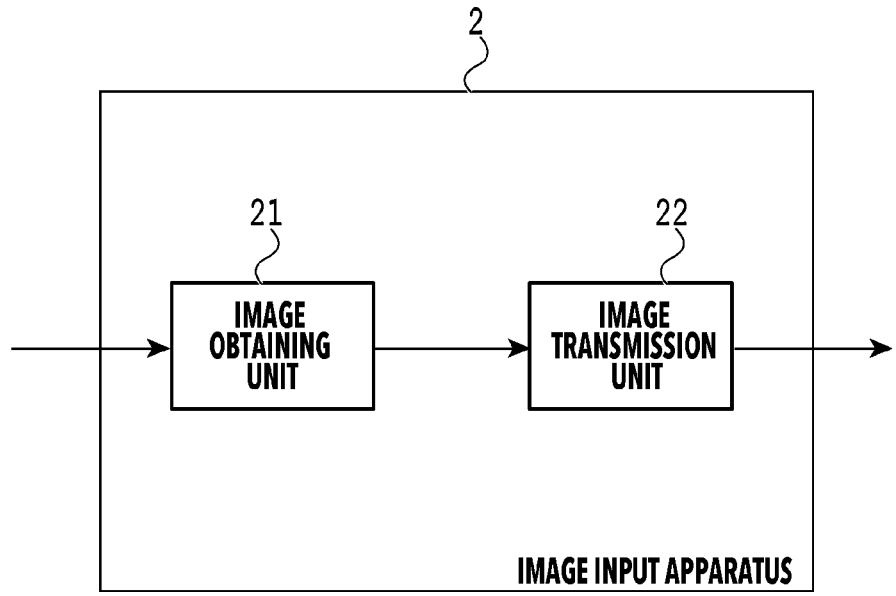
Figures 2, 2A:
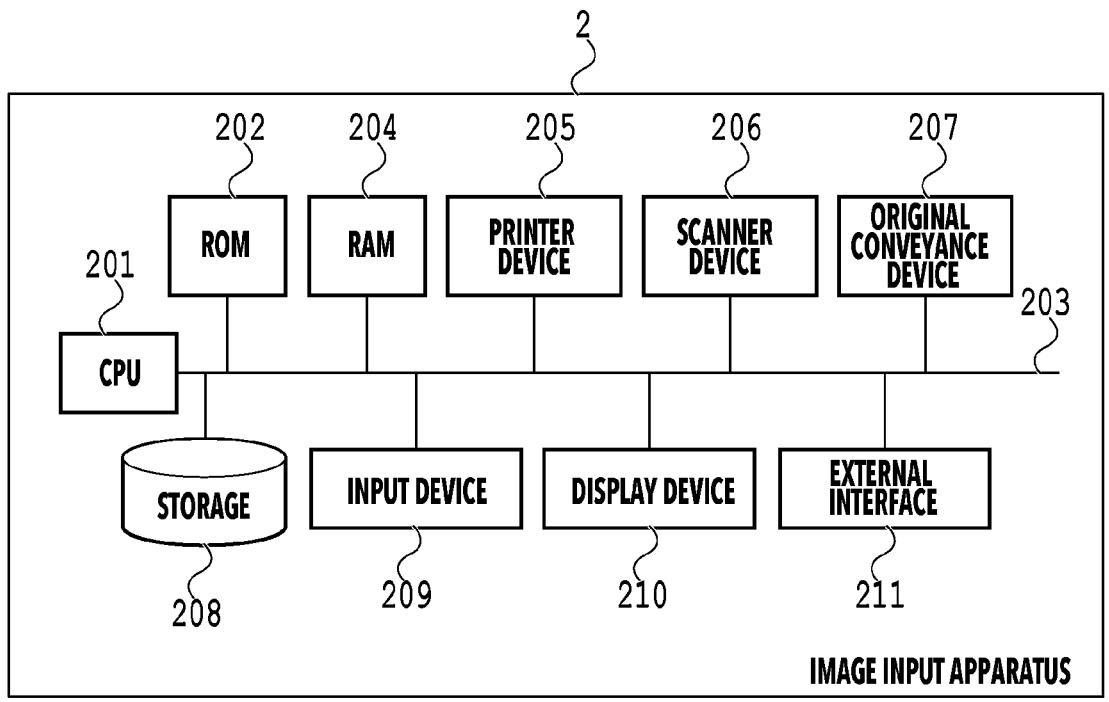

Configurations of the image input apparatus 2, the learning apparatus 3, and the information processing apparatus 4 are described with reference to FIGS. 2A-1 to 2C-2. FIGS. 2A-1 and 2A-2 are block diagrams illustrating an example of a configuration of the image input apparatus 2 according to the first embodiment. Specifically, FIG. 2A-1 is a block diagram illustrating an example of functional blocks included in the image input apparatus 2 according to the first embodiment. The image input apparatus 2 includes an image obtaining unit 21 and an image transmission unit 22. The image obtaining unit 21 obtains the document image 13. The image transmission unit 22 transmits the data of the document image 13 obtained by the image obtaining unit 21 to the information processing apparatus 4 via the network 5.

Processes of the units configured to function in the image input apparatus 2 are performed by hardware such as an application specific integrated circuit (ASIC) incorporated in the image input apparatus 2. These processes may be performed by hardware such as a field programmable gate array (FPGA). Moreover, these processes may be performed by software using a memory such as a random access memory (RAM) and a processor such as a central processing unit (CPU).

FIG. 2A-2 is a block diagram illustrating an example of hardware included in the image input apparatus 2 according to the first embodiment. Specifically, the block diagram illustrated in FIG. 2A-2 illustrates an example of a hardware configuration of the image input apparatus 2 in the case where the units configured to function in the image input apparatus 2 operate as software. The image input apparatus 2 is formed of a computer and the computer includes a CPU 201, a ROM 202, a data bus 203, a RAM 204, a printer device 205, and a scanner device 206 as illustrated as an example in FIG. 2A-2. The computer also includes an original conveyance device 207, a storage 208, an input device 209, a display device 210, and an external interface 211 as illustrated as an example in FIG. 2A-2.

The CPU 201 is a processor for controlling entire operations in the image input apparatus 2. The CPU 201 executes a start-up program stored in the ROM 202 or the like to start a system of the image input apparatus 2. Moreover, the CPU 201 executes a control program stored in the storage 208 or the like to cause each of the units configured to function as the print function, the scan function, the FAX function, and the like in the image input apparatus 2 to function. Note that the configuration may be such that the image input apparatus 2 includes one or multiple pieces of dedicated hardware other than the CPU 201 and the dedicated hardware at least partially executes the processes of the CPU 201. Examples of the dedicated hardware include an ASIC, a FPGA, a digital signal processor (DSP), and the like.

The ROM 202 is a non-volatile memory configured to store programs and the like that do not have to be changed, and stores, for example, the start-up program for start-up of the image input apparatus 2. The data bus 203 couples the pieces of hardware included in the image input apparatus 2 to enable data transmission among the pieces of hardware. The RAM 204 is a volatile memory that temporarily stores a program or data supplied from the ROM 202, the storage 208, or the like or data or the like supplied from the outside via the external interface 211. The RAM 204 is used as a work memory in the case where the CPU 201 executes programs such as the start-up program and the control program.

The printer device 205 is a device for image output and is a device for performing print output by printing a document image obtained in the image input apparatus 2 onto a printing medium such as paper. The scanner device 206 is a device for image input and is a device for optically scanning a printing medium such as a paper on which characters, figures, and the like are printed and obtaining the characters, figures, and the like as the document image. The original conveyance device 207 is a device for detecting originals placed on an original stand not illustrated in FIG. 2A-2 and conveying the detected originals one by one to the scanner device 206. The original conveyance device 207 is achieved by an auto document feeder (ADF) or the like.

The storage 208 is achieved by a hard disk drive (HDD) or the like and is an auxiliary storage device for storing the aforementioned control program or the document image data. The input device 209 is achieved by a touch panel, a hard key, or the like and is a device for receiving operation inputs on the image input apparatus 2 from a user. The display device 210 is achieved by a liquid crystal display or the like and is a device for performing display output such that the user can view display images such as a setting screen outputted by the image input apparatus 2. The external interface 211 couples the image input apparatus 2 and the network 5 to each other and is an interface that receives the FAX data 12 from a FAX transmitter not illustrated in FIG. 2A-2 and that transmits the data of document image to the information processing apparatus 4.

Figures 1, 2B:
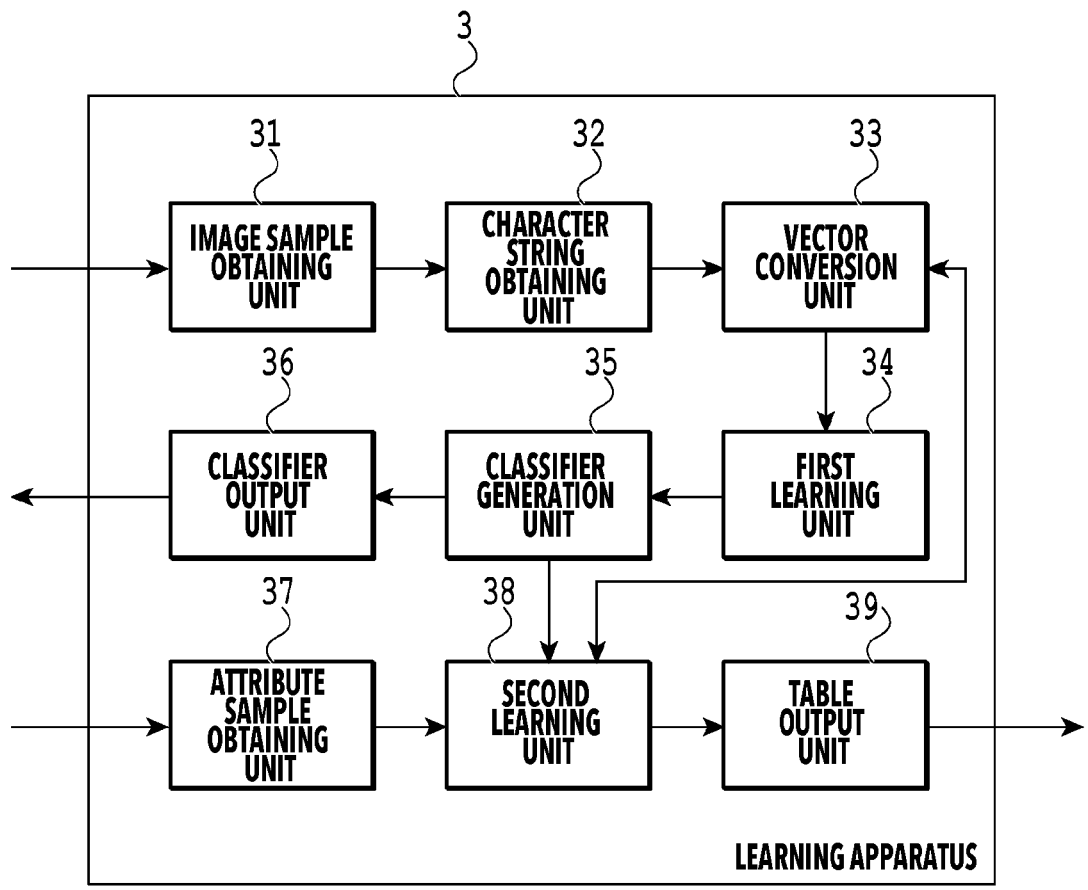
Figures 2, 2B:
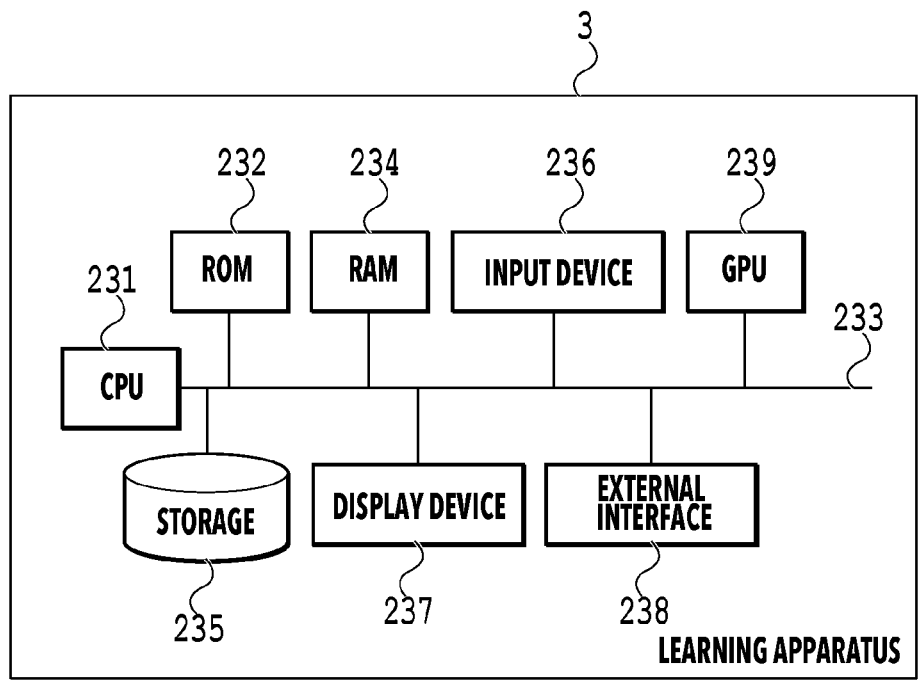

FIGS. 2B-1 and 2B-2 are block diagrams illustrating an example of a configuration of the learning apparatus 3 according to the first embodiment. Specifically, FIG. 2B-1 is a block diagram illustrating an example of functional blocks included in the learning apparatus 3 according to the first embodiment. The learning apparatus 3 includes an image sample obtaining unit 31, a character string obtaining unit 32, a vector conversion unit 33, a first learning unit 34, a classifier generation unit 35, a classifier output unit 36, an attribute sample obtaining unit 37, a second learning unit, and a table output unit 39.

The image sample obtaining unit 31 obtains the document image samples 14. Specifically, for example, the image sample obtaining unit 31 obtains the document image samples 14 by reading the document image samples 14, corresponding to an operation input by the user, from a storage device not illustrated in FIG. 2B-1 based on the operation input. The character string obtaining unit 32 obtains one or more pieces of data of character strings that are included in document images illustrated in the document image samples 14 obtained by the image sample obtaining unit 31. The vector conversion unit 33 converts each of the one or more pieces of character string data obtained by the character string obtaining unit 32 to a feature vector for each piece of character string data. The first learning unit 34 performs machine learning of a learning model by inputting the feature vector converted by the vector conversion unit 33 into the learning model as the data for learning. The classifier generation unit 35 receives the learned model that is the result of learning by the first learning unit 34 and generates the character string classifier 15 based on the learned model. Note that the classifier generation unit 35 may set the learned model that is the result of learning by the first learning unit 34 as the character string classifier 15 without performing a process on the learned model. The classifier output unit 36 outputs the character string classifier 15 generated by the classifier generation unit 35 to the information processing apparatus 4 or a storage device not illustrated in FIG. 2B-2.

The attribute sample obtaining unit 37 obtains the attribute character string samples 17. Specifically, for example, the attribute sample obtaining unit 37 obtains the attribute character string samples 17 by reading the attribute character string samples 17, corresponding to an operation input by the user, from a storage device not illustrated in FIG. 2B-1 based on the operation input. Details of the attribute character string samples 17 are described later. The second learning unit 38 generates the attribute information table 18 by using the character string classifier 15 generated by the classifier generation unit 35 and the attribute character string samples 17 obtained by the attribute sample obtaining unit 37. The table output unit 39 outputs the attribute information table 18 generated by the second learning unit 38 to the information processing apparatus 4 or a storage device not illustrated in FIG. 2B-2. Details of processes of the units included in the learning apparatus 3 are described later.

The processes of the units configured to function in the learning apparatus 3 are performed by hardware such as an ASIC or FPGA incorporated in the learning apparatus 3 or software using a memory such as a RAM and a processor such as a CPU. FIG. 2B-2 is a block diagram illustrating an example of hardware included in the learning apparatus 3 according to the first embodiment. Specifically, the block diagram illustrated in FIG. 2B-2 illustrates an example of a hardware configuration of the learning apparatus 3 in the case where the units configured to function in the learning apparatus 3 operate as software. The learning apparatus 3 is formed of a computer and the computer includes a CPU 231, a ROM 232, a data bus 233, a RAM 234, a storage 235, an input device 236, and a display device 237 as illustrates as an example in FIG. 2B-2. The computer also includes an external interface 238 and a GPU 239 as illustrated as an example in FIG. 2B-2.

The CPU 231 is a processor for controlling entire operations in the learning apparatus 3. The CPU 231 executes a start-up program stored in the ROM 232 or the like to start a system of the learning apparatus 3. Moreover, the CPU 231 executes a control program stored in the storage 235 to cause each unit configured to function in the learning apparatus 3 to function. Note that the configuration may be such that the learning apparatus 3 includes one or multiple pieces of dedicated hardware other than the CPU 231 and the dedicated hardware at least partially executes the processes of the CPU 231. Examples of the dedicated hardware include an ASIC, a FPGA, a DSP, and the like.

The ROM 232 is a non-volatile memory configured to store programs and the like that do not have to be changed, and stores, for example, the start-up program for start-up of the learning apparatus 3. The data bus 233 couples the pieces of hardware included in the learning apparatus 3 to transmit data among the pieces of hardware. The RAM 234 is a volatile memory that temporarily stores a program or data supplied from the ROM 232, the storage 235, or the like or data or the like supplied from the outside via the external interface 238. The RAM 234 is used as a work memory in the case where the CPU 231 executes programs such as the start-up program and the control program. The storage 235 is achieved by an HDD or the like and is an auxiliary storage device for storing the aforementioned control program, the document image sample data 14, or the like.

The input device 236 is achieved by a mouse, a keyboard, or the like and is a device for receiving operation inputs on the learning apparatus 3 from a user such as an engineer (hereinafter, simply referred to as "engineer"). The display device 237 is achieved by a liquid crystal display or the like and is a device for performing display output such that the engineer can view display images such as a setting screen of the learning apparatus 3. The external interface 238 couples the learning apparatus 3 and the network 5 to each other and is an interface for receiving the document image samples 14 from a storage device not illustrated in FIG. 2B-2 or an external apparatus such as a PC. Moreover, the external interface 238 is an interface for outputting the character string classifier 15 to the information processing apparatus 4 or a storage device not illustrated in FIG. 2B-2. The GPU 239 is a processor capable of performing image processes. The GPU 239 performs, for example, computation for generating the character string classifier 15 according to a control command received from the CPU 231, based on data of character strings included in the received document images.

Figures 1, 2C:
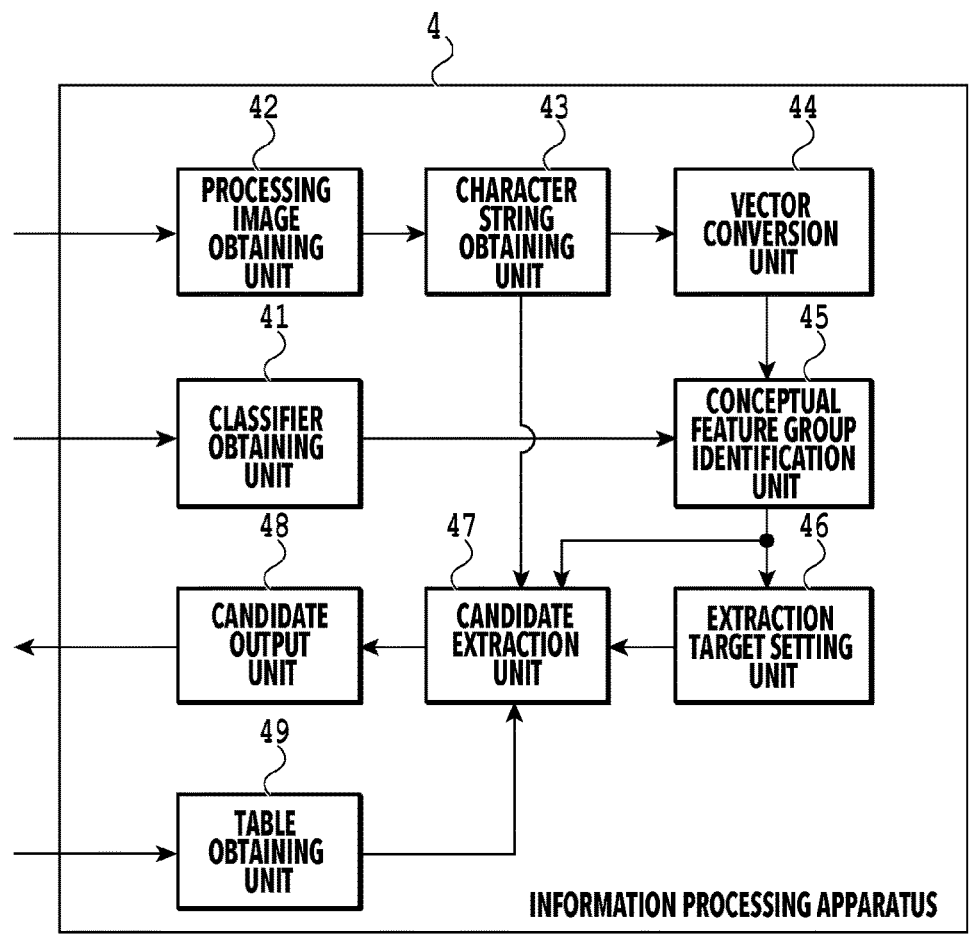
Figures 2, 2C:
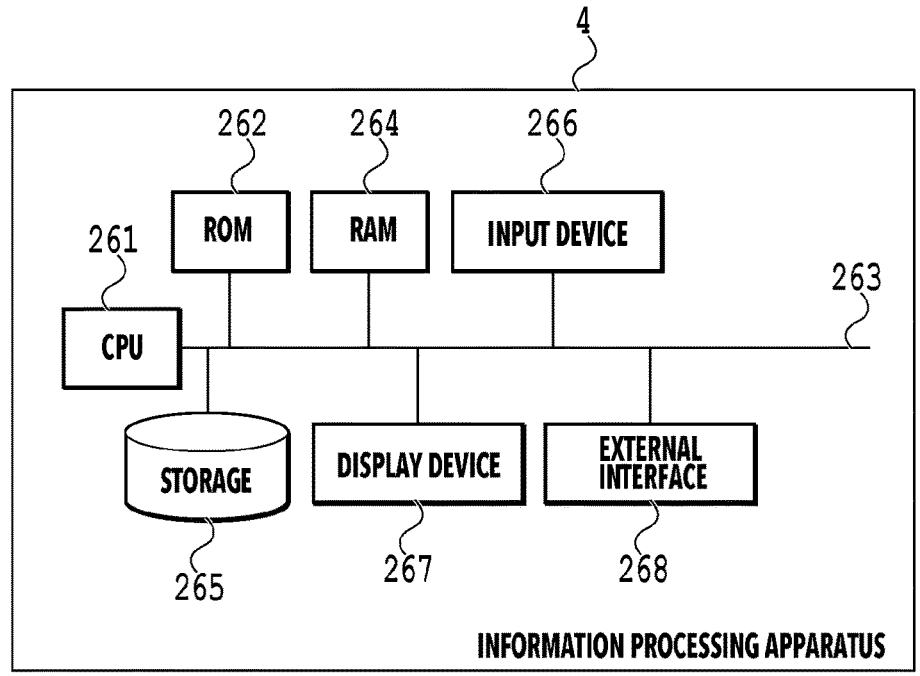

FIGS. 2C-1 and 2C-2 are block diagrams illustrating an example of a configuration of the information processing apparatus 4 according to the first embodiment. Specifically, FIG. 2C-1 is a block diagram illustrating an example of functional blocks included in the information processing apparatus 4 according to the first embodiment. The information processing apparatus 4 includes a classifier obtaining unit 41, a processing image obtaining unit 42, a character string obtaining unit 43, a vector conversion unit 44, a conceptual feature group identification unit 45, an extraction target setting unit 46, a candidate extraction unit 47, a candidate output unit 48, and a table obtaining unit 49.

The classifier obtaining unit 41 obtains the character string classifier 15. Specifically, for example, the classifier obtaining unit 41 obtains the character string classifier 15 by receiving the character string classifier 15 outputted by the learning apparatus 3. The classifier obtaining unit 41 may obtain the character string classifier 15 stored in advance in a storage device not illustrated in FIG. 2C-1 by reading the character string classifier 15 from the storage device. The processing image obtaining unit 42 obtains the document image 13. Specifically, for example, the processing image obtaining unit 42 obtains the document image 13 by receiving data of the document image 13 transmitted by the image input apparatus 2. The processing image obtaining unit 42 may obtain the document image 13 stored in advance in a storage device not illustrated in FIG. 2C-1 by reading the data of the document image 13 from the storage device. The character string obtaining unit 43 obtains one or more pieces of data of character strings included in the document image 13. The vector conversion unit 44 converts each of the one or more pieces of the character string data obtained by the character string obtaining unit 43 to a feature vector for each piece of character string data.

The conceptual feature group identification unit 45 identifies a conceptual feature group to which the character string corresponding to each feature vector converted by the vector conversion unit 44 belongs, from among predetermined multiple conceptual feature groups, based on the feature vector. Specifically, the conceptual feature group identification unit 45 inputs the feature vector converted by the vector conversion unit 44 into the character string classifier 15 obtained by the classifier obtaining unit 41, as the explanatory variable. The conceptual feature group identification unit 45 obtains information (hereinafter, referred to as "group identification (ID)") on an identification number or the like that is outputted as an inference result by the character string classifier 15 and by which the conceptual feature group can be identified. The conceptual feature group to which the character string corresponding to the feature vector belongs is identified by using the group ID.

The extraction target setting unit 46 sets the conceptual feature group identified by the conceptual feature group identification unit 45 as an extraction target group. The extraction target setting unit 46 outputs information indicating the extraction target group as extraction target group information. Specifically, the extraction target setting unit 46 outputs the extraction target group information to a storage device such as a storage 265 and stores the extraction target group information therein. The table obtaining unit 49 obtains the attribute information table 18. Specifically, for example, the table obtaining unit 49 obtains the attribute information table 18 by receiving the attribute information table 18 outputted by the learning apparatus 3.

The candidate extraction unit 47 selects and extracts a candidate character string from among the one or more pieces of character string data obtained by the character string obtaining unit 43 and included in the document image 13, based on the extraction target group. Specifically, for example, the candidate extraction unit 47 first obtains the extraction target group information stored in advance in a storage device not illustrated in FIG. 2C-1 by reading the extraction target group information from the storage device. Next, the candidate extraction unit 47 obtains one or more conceptual feature groups (hereinafter, referred to as "conceptual feature group set") associated with the same attribute information as the attribute information associated with the extraction target group, by using the attribute information table 18 obtained by the table obtaining unit 49. Then, the candidate extraction unit 47 compares each of the conceptual feature groups forming the conceptual feature group set and the conceptual feature group identified by the conceptual feature group identification unit 45 for each character string included in the document image 13. The candidate extraction unit 47 extracts the data of the candidate character string based on a result of this comparison. The candidate output unit 48 outputs the character string data 16 extracted by the candidate extraction unit 47 as the data of candidate character string. Specifically, for example, the candidate output unit 48 outputs and displays the character string data 16 on a display device not illustrated in FIG. 2C-1. Detailed processes of the units included in the information processing apparatus 4 are described later.

The processes of the units configured to function in the information processing apparatus 4 are performed by hardware such as an ASIC or FPGA incorporated in the information processing apparatus 4 or software using a memory such as a RAM and a processor such as a CPU. FIG. 2C-2 is a block diagram illustrating an example of hardware included in the information processing apparatus 4 according to the first embodiment. Specifically, the block diagram illustrated in FIG. 2C-2 illustrates an example of a hardware configuration of the information processing apparatus 4 in the case where the units configured to function in the information processing apparatus 4 operate as software. The information processing apparatus 4 is formed of a computer and the computer includes a CPU 261, a ROM 262, a data bus 263, a RAM 264, and the storage 265 as illustrated as an example in FIG. 2C-2. The computer also includes an input device 266, a display device 267, and an external interface 268 as illustrated as an example in FIG. 2C-2.

The CPU 261 is a processor for controlling entire operations in the information processing apparatus 4. The CPU 261 executes a start-up program stored in the ROM 262 or the like to start a system of the information processing apparatus 4. Moreover, the CPU 261 executes a control program stored in the storage 265 to cause each unit configured to function in the information processing apparatus 4 to function. Note that the configuration may be such that the information processing apparatus 4 includes one or multiple pieces of dedicated hardware other than the CPU 261 and the dedicated hardware at least partially executes the processes of the CPU 261. Examples of the dedicated hardware include an ASIC, a FPGA, a DSP, and the like.

The ROM 262 is a non-volatile memory configured to store programs and the like that do not have to be changed, and stores, for example, the start-up program for start-up of the information processing apparatus 4. The data bus 263 couples the pieces of hardware included in the information processing apparatus 4 to transmit data among the pieces of hardware. The RAM 264 is a volatile memory that temporarily stores a program or data supplied from the ROM 262, the storage 265, or the like or data or the like supplied from the outside via the external interface 268. The RAM 264 is used as a work memory in the case where the CPU 261 executes programs such as the start-up program and the control program. The storage 265 is achieved by an HDD or the like and is an auxiliary storage device for storing the aforementioned control program, the data of the document image 13, the character string classifier 15, the character string data 16, the attribute information table 18, or the like.

The input device 266 is achieved by a mouse, a keyboard, or the like and is a device for receiving operation inputs on the information processing apparatus 4 from the user. The display device 267 is achieved by a liquid crystal display or the like and is a device for performing display output such that the user can view display images such as a setting screen of the information processing apparatus 4. The external interface 268 couples the information processing apparatus 4 and the network 5 to each other and is an interface for receiving the character string classifier 15 from the learning apparatus 3 or an external apparatus such as a storage apparatus not illustrated in FIG. 2C-2. Moreover, the external interface 268 is an interface for receiving the data of the document image 13 from the image input apparatus 2 or an external apparatus such as a storage apparatus not illustrated in FIG. 2C-2.

<Processing Sequence>

Figure 3B:
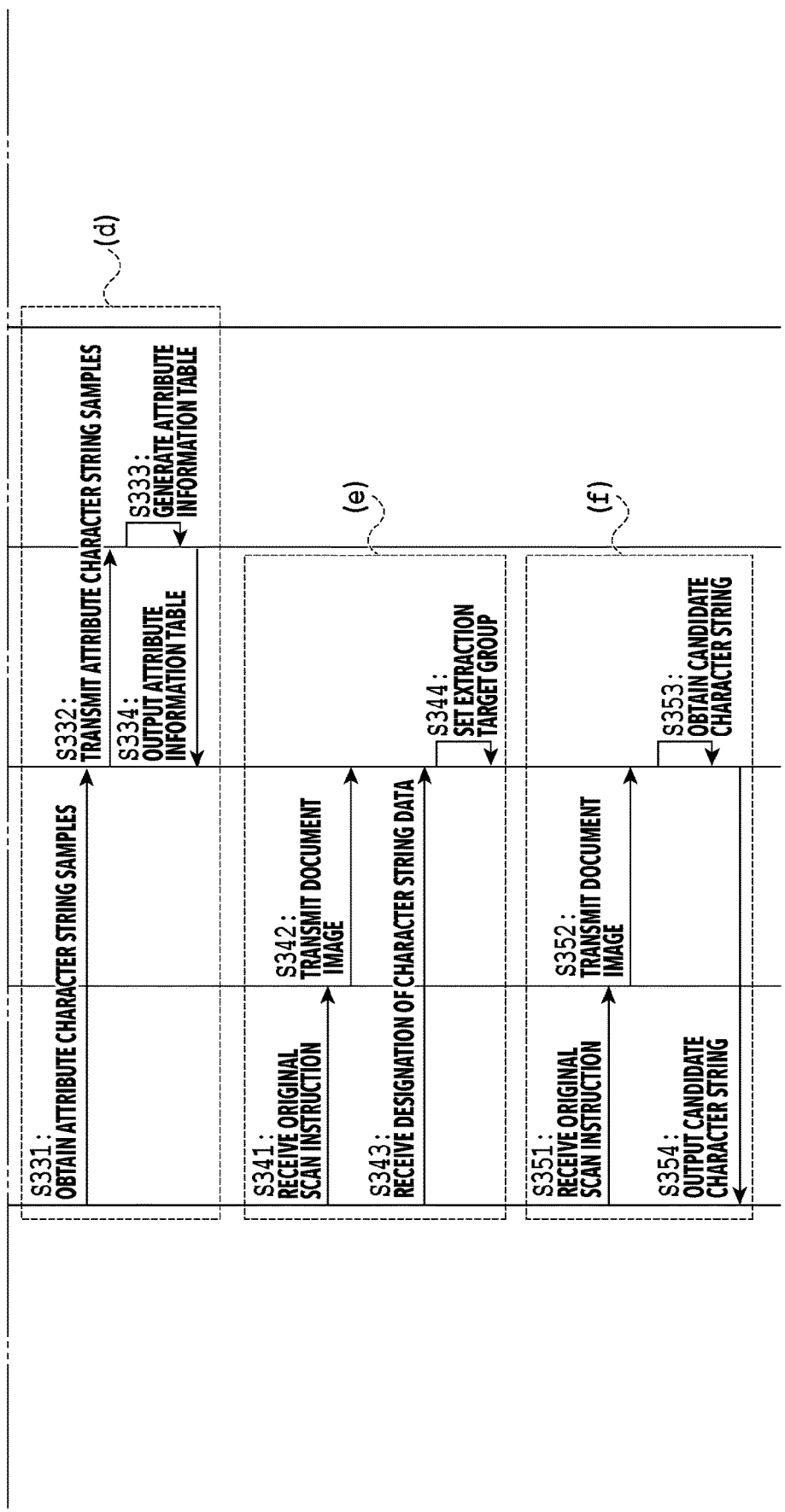

A processing sequence of the information processing system 1 is described with reference to FIGS. 3A and 3B. FIGS. 3A and 3B are sequence diagrams illustrating an example of the processing sequence of the information processing system 1 according to the first embodiment. As illustrated as an example in FIGS. 3A and 3B, in the information processing system 1, the processing sequence can be divided into six processing sequences of (a) to (f). Note that, in the description of FIGS. 3A and 3B, reference sign "S" means step.

Reference sign (a) illustrated in FIG. 3A denotes a processing sequence in which the learning apparatus 3 generates the character string classifier 15. The processing sequence of (a) illustrated in FIG. 3A is a processing sequence executed in development by the engineer. In the processing sequence of (a) illustrated in FIG. 3A, in S301, the engineer developing the information processing system 1 first inputs multiple document image samples 14 into the learning apparatus 3. Specifically, for example, the engineer inputs information indicating locations and the like of the multiple document image samples 14 to instruct the learning apparatus 3 to obtain the document image samples 14. The learning apparatus 3 obtains the document image samples 14 based on the input from the engineer.

After S301, in S302, the learning apparatus 3 first obtains data of character strings included in a document image of each of the document image samples 14. Next, the learning apparatus 3 generates a learned model by performing machine learning based on the obtained character string data and generates multiple conceptual feature groups. Moreover, the learning apparatus 3 generates the character string classifier 15 based on the learned model. The character string classifier 15 generated in this case is a classifier that receives a feature vector corresponding to each piece of character string data as an explanatory variable and infers a conceptual feature group to which the character string data corresponding to the feature vector belongs from among the generated multiple conceptual feature groups and that outputs the result of the inference. The character string classifier 15 may be a classifier that internally includes a language model configured to convert the character string data to the feature vector and that receives the character string data as the explanatory variable. After S302, in S303, the learning apparatus 3 transmits the generated character string classifier 15 to the information processing apparatus 4. The information processing apparatus 4 obtains the character string classifier 15 transmitted from the learning apparatus 3 and saves the character string classifier 15 in the storage 265 included in the information processing apparatus 4. Note that details of the processing sequence of (a) illustrated in FIG. 3A is described later by using FIG. 4.

Reference sign (b) illustrated in FIG. 3A denotes a processing sequence in which the learning apparatus 3 generates the attribute information table 18. The processing sequence of (b) illustrated in FIG. 3A is a processing sequence executed in development by the engineer. The processing sequences of (a) and (b) illustrated in FIG. 3A are executed in advance before the processing sequences of (c) to (f) illustrated in FIG. 3A or 3B and described later. In the processing sequence of (b) illustrated in FIG. 3A, in S311, the engineer first inputs the attribute character string samples 17 into the learning apparatus 3. Specifically, for example, the engineer inputs information indicating locations and the like of the attribute character string samples 17 to instruct the learning apparatus 3 to obtain the attribute character string samples 17. The learning apparatus 3 obtains the attribute character string samples 17 based on the input from the engineer.

After S311, in S312, the learning apparatus 3 first identifies a conceptual feature group to which each of pieces of character string data included in the attribute character string samples 17 belongs, by using the character string classifier 15 generated in S302. Next, the learning apparatus 3 generates the attribute information table 18 by associating the identified conceptual feature group and the attribute information corresponding to the character string data with each other. After S312, in S313, the learning apparatus 3 transmits the attribute information table 18 generated in S312 to the information processing apparatus 4. The information processing apparatus 4 obtains the attribute information table 18 transmitted by the learning apparatus 3 and saves the attribute information table 18 in the storage 265 included in the information processing apparatus 4. Note that details of the processing sequence of (b) illustrated in FIG. 3A are described later by using FIGS. 5A and 5B.

Reference sign (c) illustrated in FIG. 3A denotes a processing sequence of setting an extraction target group to be used in extraction of data of candidate character strings in the later-described processing sequence of (f) illustrated in FIG. 3B. Specifically, the processing sequence of (c) illustrated in FIG. 3A is a processing sequence of setting a conceptual feature group to which data of a character string belongs as the extraction target group, the character string selected from among one or more character strings included in a document image 13 by an operation input from the engineer. Note that the processing sequence of (c) illustrated in FIG. 3A is performed by the engineer during development of the information processing apparatus 4. Meanwhile, the later-described processing sequence of (e) illustrated in FIG. 3B is performed by a user such as an end user (hereinafter, simply referred to as "end user") during an operation. Specifically, the processing sequence of (c) illustrated in FIG. 3A is a processing sequence in which, instead of the end user, the engineer performs the setting of the extraction target group to be performed in the processing sequence of (e) illustrated in FIG. 3B, in advance during the development.

In the processing sequence of (c) illustrated in FIG. 3A, in S311, the engineer first inputs data of a document image 13 into the information processing apparatus 4. Specifically, for example, the engineer inputs information indicating the location and the like of the data of the document image 13 to instruct the information processing apparatus 4 to obtain the data of the document image 13. The information processing apparatus 4 obtains the data of the document image 13 based on the input from the engineer. After S311, in S312, the information processing apparatus 4 first obtains one or more pieces of data of character strings included in the document image 13. Next, the information processing apparatus 4 receives, from the engineer, an operation input for designating a character string desired by the engineer from among the obtained one or more pieces of character string data. After S312, in S313, the information processing apparatus 4 first identifies a conceptual feature group to which the character string designated by the operation input received in S312 belongs by using the character string classifier 15 obtained in S303. Next, the information processing apparatus 4 designates the identified conceptual feature group as the extraction target group and saves information (hereinafter, referred to as "extraction target group information") indicating the extraction target group in the storage 265 or the like. Note that details of the processing sequence of (c) illustrated in FIG. 3A are described later by using FIG. 6.

Reference sign (d) illustrated in FIG. 3B denotes a processing sequence in which the learning apparatus 3 generates the attribute information table 18. The processing sequence of (d) illustrated in FIG. 3B is a processing sequence that is executed during the operation by the end user and in which processes similar to the aforementioned processing sequence of (b) illustrated in FIG. 3A are performed. In the processing sequence of (d) illustrated in FIG. 3B, in S331, the end user first inputs the attribute character string samples 17 into the information processing apparatus 4. Specifically, for example, the end user inputs information indicating locations and the like of the attribute character string samples 17 into the information processing apparatus 4 to instruct the information processing apparatus 4 to obtain the attribute character string samples 17. The information processing apparatus 4 obtains the attribute character string samples 17 based on the input from the user. After S331, in S332, the information processing apparatus 4 transmits the obtained attribute character string samples 17 to the learning apparatus 3 and the learning apparatus 3 obtains the attribute character string samples 17 by receiving the attribute character string samples 17 transmitted from the information processing apparatus 4. Note that the end user may input the information indicating the locations and the like of the attribute character string samples 17 directly into the learning apparatus 3 and instruct the learning apparatus 3 to obtain the attribute character string samples 17. In this case, the learning apparatus 3 obtains the attribute character string samples 17 based on the input from the user.

After S332, in S333, the learning apparatus 3 generates the attribute information table 18. Specifically, the learning apparatus 3 first identifies the conceptual feature group to which each of the pieces of character string data included in the attribute character string samples belongs, by using the character string classifier 15 generated in S302. Next, the learning apparatus 3 generates the attribute information table 18 by associating the identified conceptual feature group and the attribute information with each other. After S333, in S334, the learning apparatus 3 transmits the attribute information table 18 to the information processing apparatus 4. The information processing apparatus 4 obtains the attribute information table 18 transmitted by the learning apparatus 3 and saves the attribute information table 18 in the storage 265 included in the information processing apparatus 4. Note that details of the processing sequence of (d) illustrated in FIG. 3B are described later by using FIGS. 5A and 5B.

Reference sign (e) illustrated in FIG. 3B denotes a processing sequence of setting the extraction target group to be used in the extraction of data of candidate character strings in the later-described processing sequence of (f) illustrated in FIG. 3B. Note that the processing sequence of (e) illustrated in FIG. 3B is performed by the end user during the operation and is similar to the aforementioned processing sequence of (c) illustrated in FIG. 3A. Specifically, the processing sequence of (e) illustrated in FIG. 3B is a processing sequence of setting the conceptual feature group to which a character string belongs as the extraction target group, the character string selected from among one or more character strings included in a document image 13 by an operation input from the end user.

In the processing sequence of (e) illustrated in FIG. 3B, in S341, for example, the end user first places an original 11 on the image input apparatus 2 and instructs the image input apparatus 2 to scan the original 11. Upon receiving the instruction, the image input apparatus 2 optically scans the original 11 and obtains a document image 13. After S341, in S342, first, the image input apparatus 2 transmits the data of the document image 13 obtained in S341 to the information processing apparatus 4. The information processing apparatus 4 obtains the document image 13 by receiving the data of the document image 13 transmitted from the image input apparatus 2. Note that the information processing apparatus 4 only needs to obtain the document image 13 and the obtaining source of the data of the document image 13 may be the image input apparatus 2, a storage device such as the storage 265, or the like.

After S342, in S343, the information processing apparatus 4 first obtains one or more pieces of data of character strings included in the document image 13 for the data of the document image 13 obtained in S341. Next, the information processing apparatus 4 receives, from the end user, an operation input for designating a character string desired by the end user from among the obtained one or more pieces of character string data. After S342, in S343, the information processing apparatus 4 first identifies the conceptual feature group to which the character string designated by the operation input received in S342 belongs, by using the character string classifier 15 obtained in S303. Next, the information processing apparatus 4 designates the identified conceptual feature group as the extraction target group and saves the extraction target group information in the storage 265 or the like. Note that details of the processing sequence of (e) illustrated in FIG. 3B are described later by using FIG. 6.

Reference sign (f) illustrated in FIG. 3B denotes a processing sequence in which the information processing apparatus 4 extracts data of candidate character strings from among data of character strings included in document images 13 based on the extraction target group preset in the processing sequence of (c) or (e) illustrated in FIG. 3A or 3B. Note that, in (f) illustrated in FIG. 3B, the candidate character strings can be repeatedly extracted from multiple document images 13 having layouts different from a layout of the document image 13 used in the execution of the processing sequence of (c) or (e) illustrated in FIG. 3A or 3B. Moreover, in (f) illustrated in FIG. 3B, one or more candidate character strings can be extracted by repeatedly determining whether each of the one or more of the character strings included in the document images 13 correspond to the candidate character string or not.

In the processing sequence of (f) illustrated in FIG. 3B, in S351, the end user places an original 11 on the image input apparatus 2 and instructs the image input apparatus 2 to scan the original 11. Upon receiving the instruction, the image input apparatus 2 optically scans the original 11 and obtains a document image 13. After S351, in S352, first, the image input apparatus 2 transmits the data of the document image 13 obtained in S351 to the information processing apparatus 4. The information processing apparatus 4 obtains the document image 13 by receiving the data of the document image 13 transmitted from the image input apparatus 2. Note that the information processing apparatus 4 only needs to obtain the document image 13 and the obtaining source of the data of the document image 13 may be the image input apparatus 2, a storage device such as the storage 265, or the like.

After S352, in S353, the information processing apparatus 4 extracts data of candidate character string from among one or more pieces of data of character strings included in the document image 13 obtained in S352. Specifically, the information processing apparatus 4 first obtains the one or more pieces of data of character strings included in the document image 13 obtained in S352 and identifies the conceptual feature group to which each piece of obtained character string data belongs by using the character string classifier 15 obtained in S303. Next, the information processing apparatus 4 extracts the data of candidate character string from among the one or more pieces of character strings included in the document image 13 based on the conceptual feature group identified in S352, the extraction target group set in S323 or S344 and the attribute information table 18 obtained in S313 or S334. After S353, in S354, the information processing apparatus 4 performs display output such that the end user can view a candidate of the data of candidate character string extracted in S353. Note that details of the processing sequence of (f) illustrated in FIG. 3B are described later by using FIGS. 7A and 7B.

<Process of Generating Character String Classifier>

Figure 4:
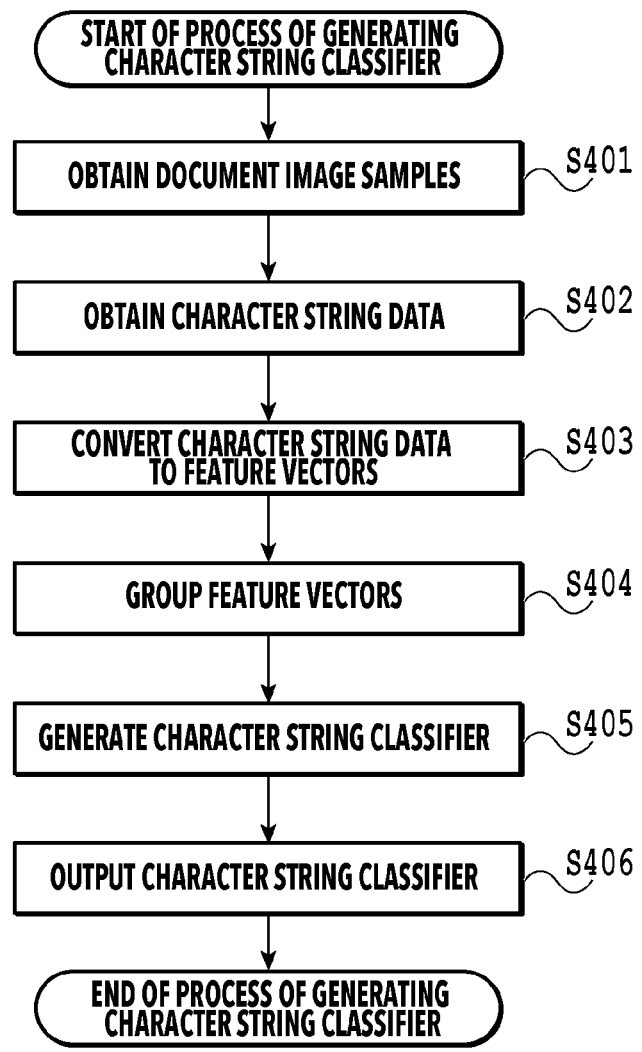
FIG. 4 is a flowchart illustrating a flow example of a part of a process in the learning apparatus according to the first embodiment.

A flow of a process in which the learning apparatus 3 generates the character string classifier 15 in (a) illustrated in FIG. 3A is described with reference to FIG. 4. FIG. 4 is a flowchart illustrating an example of the flow of the process in which the learning apparatus 3 according to the first embodiment generates the character string classifier 15. Note that, in the description of FIG. 4, reference sign "S" means step. Moreover, for example, a program configured to execute each step illustrated in FIG. 4 is stored in the ROM 232, the RAM 234, or the storage 235 of the learning apparatus 3 and is executed by the CPU 231 or the GPU 239 of the learning apparatus 3.

First, in S401, the image sample obtaining unit 31 obtains multiple document image samples 14. Specifically, for example, the image sample obtaining unit 31 obtains data of document images handled in a back office of human resource, medical care, accounting, or the like as the document image samples 14. In this case, the image sample obtaining unit 31 may target and obtain only the data of the document images handled in a specific business field such as, for example, document images handled in the medical back office, as the document image samples 14. Alternatively, the image sample obtaining unit 31 may target and obtain the data of the document images handled in multiple business fields different from each other such as document images handled in the business fields of human resources, medical care, and accounting.

Next, in S402, the character string obtaining unit 32 obtains data of character strings included in each of the multiple document image samples 14 obtained by the image sample obtaining unit 31. Specifically, for example, the character string obtaining unit 32 executes the OCR process on each of the multiple document image samples 14 and obtains multiple pieces of character string data acquired as a character recognition result of the OCR process. For example, the character string obtaining unit 32 executes the OCR process in units of word segments arranged to be segmented by a space, a rule, or the like in the document image, by using a block selection technique that identifies units of objects forming a document image of a semi-fixed form document. Since the block selection is a well-known technique, description thereof is omitted. Alternatively, for example, the character string obtaining unit 32 may execute the OCR process in units of divided words by dividing a text included in a document image of a non-fixed form document into words by using a well-known morphological analysis method.

Next, in S403, the vector conversion unit 33 converts each of the multiple pieces of character string data obtained by the character string obtaining unit 32 to a feature vector. Specifically, for example, the vector conversion unit 33 converts the character string data to the feature vector by using a well-known method such as Word2Vec, GloVe, fastText, BERT, XLNet, or ALBERT. For example, the vector conversion unit 33 uses a language model of BERT obtained by learning in advance massive amounts of general documents registered in Web sites such as Wikipedia (registered trademark). The vector conversion unit 33 can thereby convert the character string data of each character string included in the document into a feature vector expressed by a numerical value with 768 dimensions or the like.

Figure 11A:
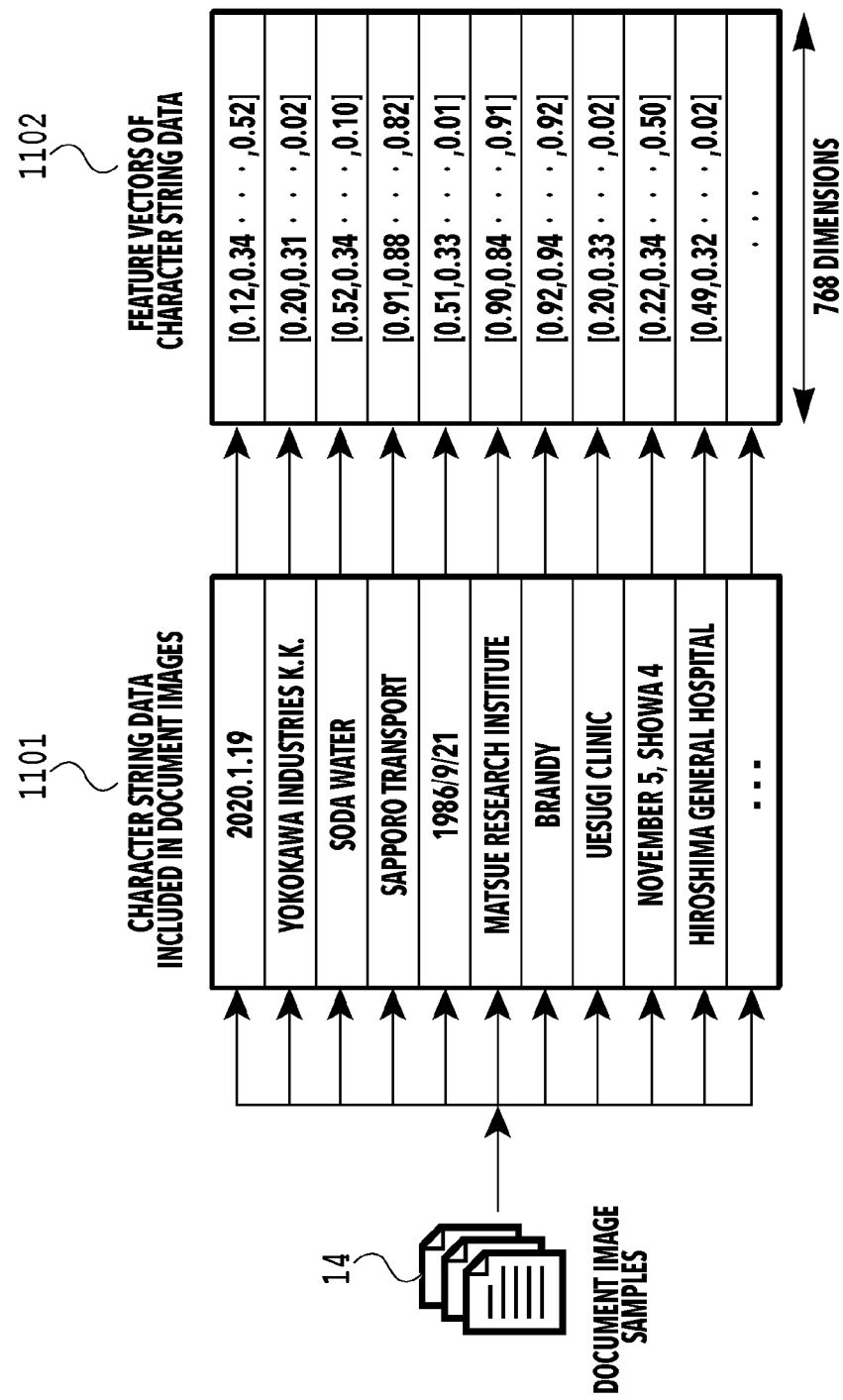
FIG. 11A is a conceptual diagram illustrating an example of how pieces of data of character string are converted to feature vectors and FIGS. 11B and 11C are conceptual diagrams illustrating an example in which the pieces of character string data are classified into conceptual feature groups.
Figure 11B:
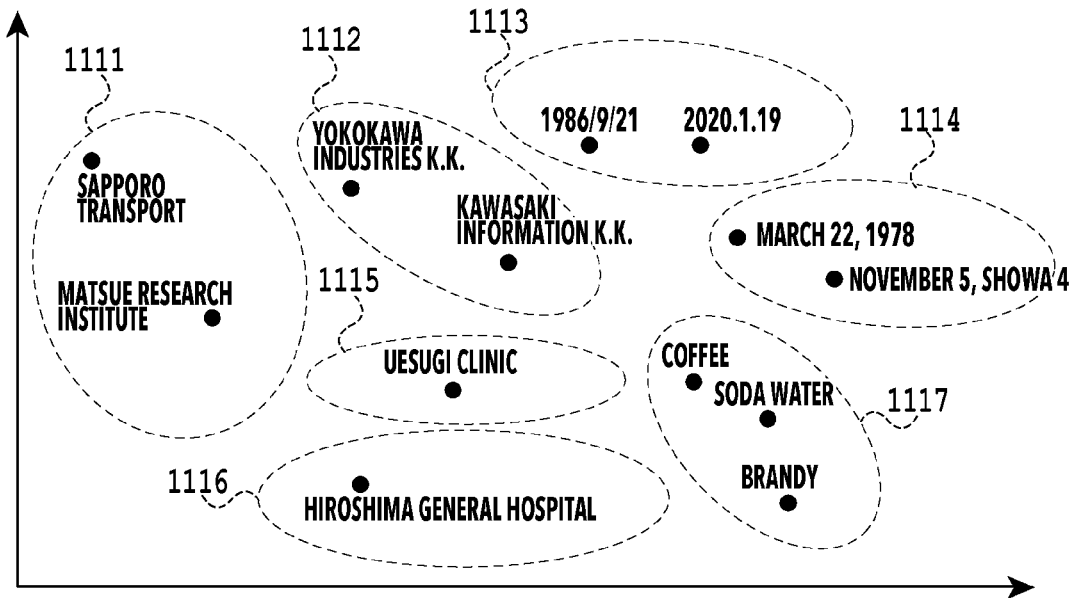
Figure 11C:
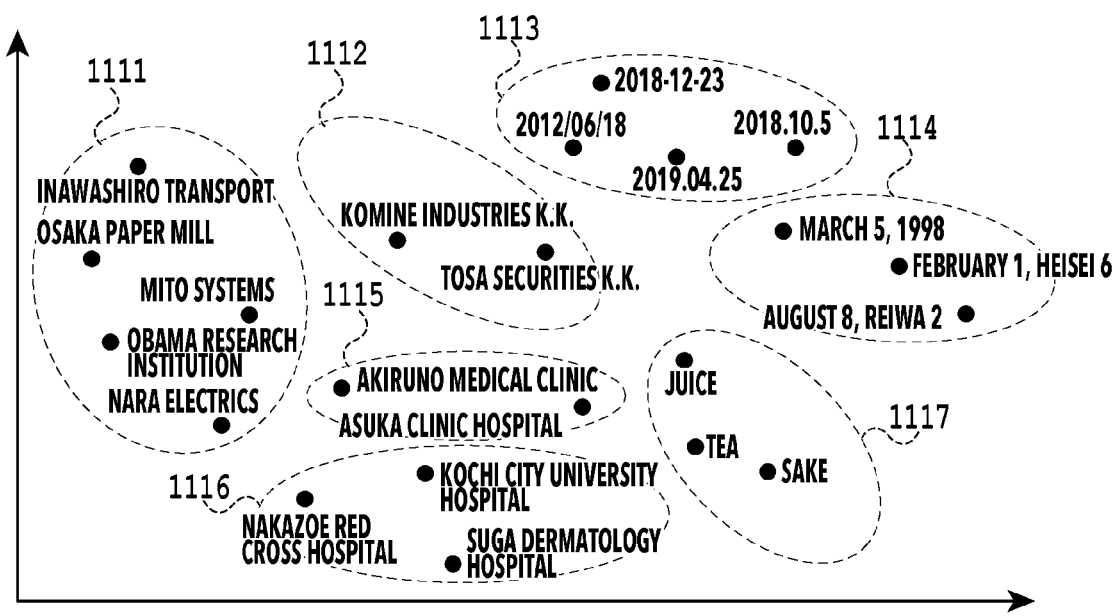

The character string data and the feature vector corresponding to the character string data are described with reference to FIGS. 11A to 11C. FIGS. 11A to 11C are explanatory diagrams for explaining examples of the character string data and the feature vector. Specifically, FIG. 11A is a conceptual diagram illustrating an example of how each piece of data of character string included in the document image samples 14 is converted to the feature vector. As illustrated in FIG. 11A, in a character string data group 1101 that is multiple pieces of data of character strings included in the document image samples 14, for example, each piece of character string data is converted to a feature vector expressed by a numerical value with 768 dimensions by using a learned language model of BERT. FIG. 11A illustrates a feature vector group 1102 as multiple feature vectors corresponding to the character string data group 1101. FIGS. 11B and 11C are described later.

After S403, in S404, the first learning unit 34 performs learning of a learning model before learning or in the middle of learning, by machine learning using the multiple feature vectors converted by the vector conversion unit 33 as data for learning. Specifically, the first learning unit 34 groups the multiple feature vectors converted by the vector conversion unit 33 into multiple conceptual feature groups by using a clustering method based on machine learning while using the feature vectors as the data for learning. In this case, the feature vector group 1102 generated by the vector conversion unit 33 indicates conceptual features of the pieces of character string data that are generally referred to as named entities, and indicates features of proper nouns such as personal names and names of places, named entities such as date and amount of money, and the like. The first learning unit 34 uses such features to automatically group the feature vectors into multiple conceptual feature groups by means of a clustering method which is one type of unsupervised machine learning, without manual provision of information indicating attributes as training data by the engineer or the like. In this case, a well-known technique including a hierarchical clustering method such as a furthest neighbor method or a nearest neighbor method, a non-hierarchical clustering method such as K-means or X-means, or the like may be used as the clustering method of grouping the feature vector group.

FIG. 11B is a conceptual diagram illustrating an example of how the multiple feature vectors are grouped into the multiple conceptual feature groups by using the clustering method based on machine learning. Specifically, FIG. 11B is a diagram in which the feature vectors expressed by numerical values with 768 dimensions illustrated in FIG. 11A are converted to be dimensionally reduced to a two-dimensional plane by using a well-known technique such as PCA or t-SNE and are visualized. As illustrated in FIG. 11B, using the aforementioned clustering method on the feature vector group 1102 of the character string data illustrated in FIG. 11A allows the feature vectors to be automatically grouped into multiple conceptual feature groups 1111 to 1117. It can be seen that the conceptual feature groups 1111 to 1117 illustrated in FIG. 11B are each, for example, corporate name, date, medical institution name, or product name. As illustrated in FIG. 11B, pieces of character string data that should be handled as corporate names are sometimes classified into the conceptual feature groups 1111 and 1112 different from each other, depending on the granularity of grouping. In this case, in the grouping by the clustering method, each of the conceptual feature groups 1111 to 1117 does not have information on what the conceptual feature group indicates and only has information by which the conceptual feature group can be identified (group ID).

Although the first learning unit 34 is described as a unit that performs learning of the learning model before learning or in the middle of learning based on machining learning using the feature vectors as the data for learning, the present disclosure is not limited to this. Specifically, for example, the configuration may be as follows. A learning model is designed in advance to include a language model that converts the character string data to the feature vector in the learning model in a design stage of the learning model, and the first learning unit 34 performs learning of the learning model based on machine learning using the character string data as the data for learning. In this case, the learning apparatus 3 requires no vector conversion unit 33.

After completion of necessary or sufficient learning in S404, in S405, the classifier generation unit 35 first obtains a learned model that is a result of the learning by the first learning unit 34. Next, the classifier generation unit 35 generates the character string classifier 15 based on the obtained learned model. The character string classifier 15 is a classifier that receives a feature vector corresponding to character string data as an explanatory variable and identifies a conceptual feature group to which the character string corresponding to the received feature vector belongs, from among the multiple conceptual feature groups generated by the aforementioned clustering method. Specifically, for example, the character string classifier 15 outputs the group ID as information indicating the identified conceptual feature group.

Note that, for example, the classifier generation unit 35 may be achieved as a unit that reuses a combination of the character string data and the conceptual feature group obtained by the aforementioned clustering method for the character string data as training data and reproduces results based on supervised machine learning. Moreover, for example, the classifier generation unit 35 may be achieved as a unit that simply calculates a barycentric position of each conceptual feature group obtained by the aforementioned clustering method and determines a conceptual feature group whose barycentric position is the nearest as a conceptual feature group with the highest similarity. After S405, in S406, the classifier output unit 36 outputs the character string classifier 15 generated by the classifier generation unit 35 to the information processing apparatus 4 to save the character string classifier 15 in the storage 265 included in the information processing apparatus 4. In the case where the character string classifier 15 does not internally include the language model that converts the character string data to the feature vector, the classifier output unit 36 may output a language model that converts the character string data to a feature vector inputtable into the character string classifier 15, in addition to the character string classifier 15. Description is given below assuming that the character string classifier 15 does not internally include the language model that converts the character string data to the feature vector. After S406, the learning apparatus 3 terminates the processes of the flowchart illustrated in FIG. 4.

<Process of Generating Attribute Information Table>

Figure 5B:
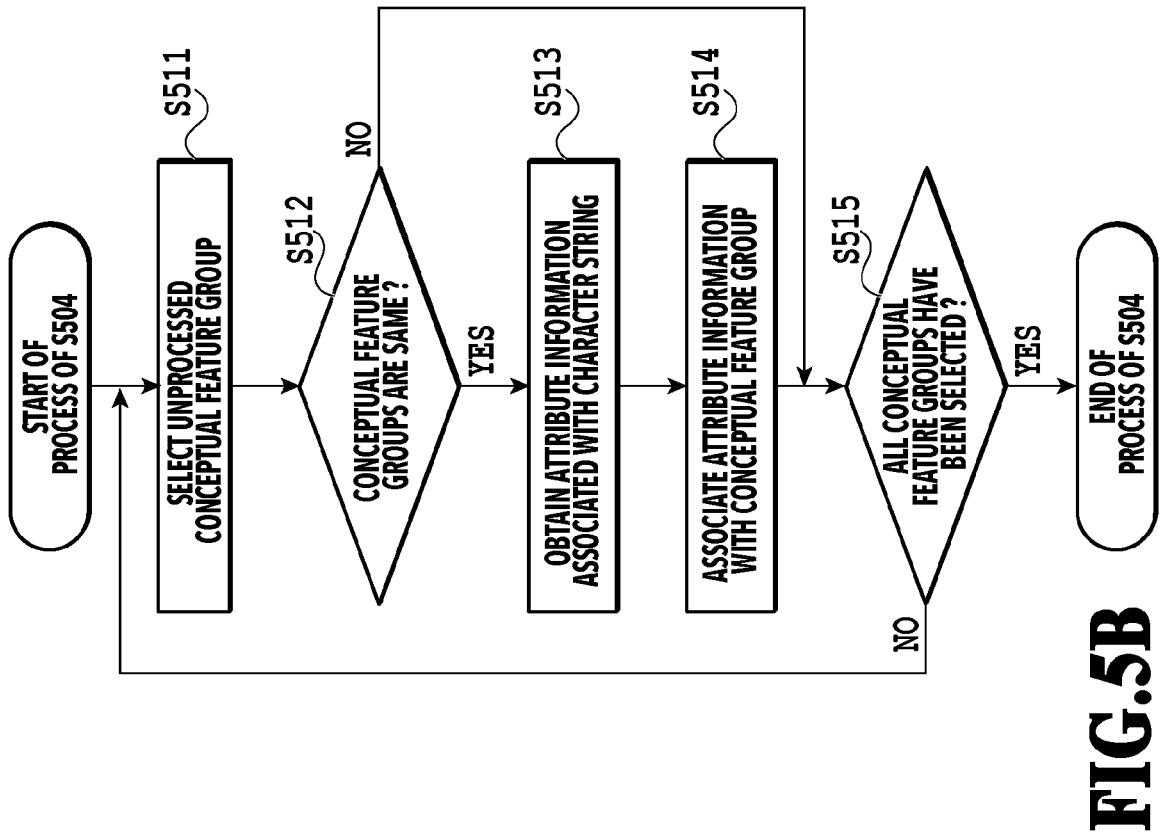
FIGS. 5A and 5B are flowcharts illustrating a flow example of another part of the process in the learning apparatus according to the first embodiment.
Figure 5A:
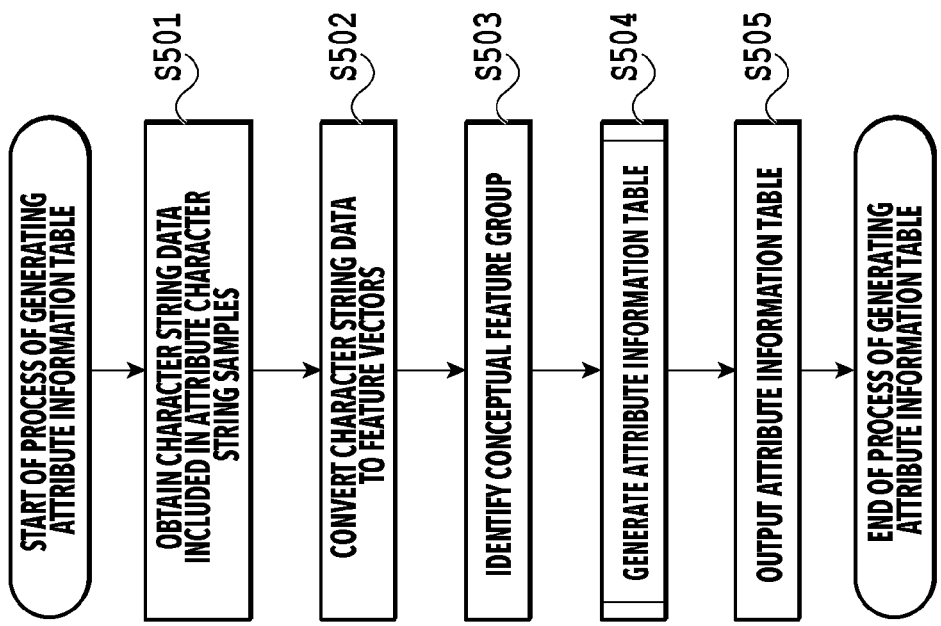

A flow of a process in which the learning apparatus 3 generates the attribute information table 18 in (b) or (d) illustrated in FIG. 3A or 3B is described with reference to FIGS. 5A and 5B. FIG. 5A is a flowchart illustrating an example of the flow of the process in which the learning apparatus 3 according to the first embodiment generates the attribute information table 18. Moreover, FIG. 5B is a flowchart illustrating a flow example of a process of S504 illustrated in FIG. 5A. Note that, in the description of FIGS. 5A and 5B, reference sign "S" means step. Moreover, for example, a program configured to execute each step illustrated in FIGS. 5A and 5B is stored in the ROM 232, the RAM 234, or the storage 235 of the learning apparatus 3 and is executed by the CPU 231 or the GPU 239 of the learning apparatus 3. First, in S501, the learning apparatus 3 obtains the character string data included in the attribute character string samples 17. Specifically, the attribute sample obtaining unit 37 first obtains the data of attribute character string samples 17 based on an operation input by the user. Next, the second learning unit 38 obtains the character string data included in the attribute character string samples 17.

The attribute character string samples 17 are described with reference to FIGS. 8A to 8C. FIGS. 8A to 8C are explanatory diagrams illustrating examples of the attribute character string samples 17. The engineer defines attributes capturing conceptual meanings generally likely to be used by end users to set the attribute information included in the attribute character string samples 17. For example, as illustrated in FIG. 8A, the engineer defines attribute groups of personal name 801, address 802, date 803, corporate name 804, medical institution name 805, and product name 806 to set character strings of the attribute groups as the attribute information in the attribute character string samples 17. Moreover, the engineer sets data of the character strings in the attribute character string samples 17 while assuming character strings to be classified into each attribute group to create the attribute character string samples 17 in which the attribute information and the character string data are associated with each other. It can be found from FIG. 8A that, except for some item values for which a data type can be defined such as the date 803, the attribute groups of the personal name 801, the address 802, the corporate name 804, the medical institution name 805, the product name 806, and the like each include many pieces of character string data with different character appearances.

Meanwhile, the end user defines attribute groups that are exclusively used in task contents of the end user such as human resource back office tasks or the like, and sets character strings of the attribute groups as the attribute information in the attribute character string samples 17. For example, in a task in which customer names are to be handled as one attribute group, there is defined an attribute group obtained by integrating the corporate name 804 and the medical institution name 805, defined as different attribute groups in FIG. 8A, as company name 811 as illustrated in FIG. 8B. Then, data of specific character strings of corporation names and medical institution names are added as character string data to be classified into the company name 811 by being associated with the attribute information corresponding to the company name 811. Moreover, in the case where the task of the end user is a task of classification to attribute groups such as tax rates and items of an account, the attribute groups may be defined as follows. In this case, for example, the product name 806 handled as one attribute group in FIG. 8A is defined as independent attribute groups such as food 821, beverage 822, alcohol 823, and expendable 824 as illustrated in FIG. 8C. Moreover, specific character string data to be classified into each attribute group only needs to be added in the attribute character string samples 17 by being associated with the attribute information corresponding to the attribute group.

After S501, in S502, the vector conversion unit 33 converts each piece of character string data obtained in S501 to a feature vector by performing a process similar to S403 for each piece of character string data. Then, in S503, the second learning unit 38 inputs each of the feature vectors obtained by the conversion in S502 into the character string classifier 15 generated in S405 and identifies the conceptual feature group to which the character string data corresponding to each feature vector belongs. FIG. 11C is a conceptual diagram illustrating an example in which the pieces of character string data included in the attribute character string samples 17 illustrated in FIG. 8A are classified into the conceptual feature groups and the feature vectors expressed by numerical values with 768 dimensions are converted to be dimensionally reduced to a two-dimensional plane and are visualized. After S503, in S504, the second learning unit 38 generates the attribute information table 18 based on the pieces of character string data obtained in S501 and the conceptual feature groups identified in S503.

The process of S504 is described with reference to FIG. 5B. First, in S511, the second learning unit 38 selects one unprocessed conceptual feature group from among all conceptual feature groups into which the character strings are classified by the character string classifier. Next, in S512, the second learning unit 38 determines, for each piece of character string data, whether the conceptual feature group of the character string data identified in S503 is the same as the conceptual feature group selected in S511. In the case where the second learning unit 38 determines that the conceptual feature groups are the same in S512, in S513, the second learning unit 38 obtains the attribute information associated with each of one or more pieces of character string data identified to belong to the same conceptual feature group as the conceptual feature group selected in S511, based on the attribute character string samples 17. Specifically, for example, the second learning unit 38 selects the conceptual feature group 1111 illustrated in FIG. 11C in S511 and obtains attribute information associated with character string data identified to belong to the conceptual feature group 1111 in S503 in the attribute character string samples 17. To be more specific, for example, in the case of data of character string "Inawashiro Transport" illustrated in FIG. 11C, the second learning unit 38 obtains the attribute information of the attribute group of corporate name 804 that is associated with this data in the attribute character string samples 17 illustrated in FIG. 8A.

After S513, in S514, the second learning unit 38 determines representative attribute information from among all pieces of attribute information obtained in S513 and saves the determined representative attribute information and the conceptual feature group selected in S511 in association with each other. Specifically, for example, the second learning unit 38 determines a piece of attribute information obtained the greatest number of times among the one or more pieces of attribute information obtained in S513 in the case where a certain conceptual feature group is selected in S511, as the representative attribute information. Note that the method of determining the representative attribute information is not limited to the aforementioned method. For example, such attribute information that feature vectors corresponding to the pieces of characters string data associated with the attribute information are distributed over the widest range in a region of the conceptual feature group may be determined as the representative attribute information.

The attribute information table 18 is described with reference to FIGS. 9A to 9C. FIGS. 9A to 9C are explanatory diagrams for explaining an example of the attribute information table 18 generated by the learning apparatus 3 according to the first embodiment. In the learning apparatus 3 according to the first embodiment, the representative attribute information and the conceptual feature group are saved in association with each other. Accordingly, as in the attribute information table 18 illustrated in FIG. 9A, for example, corporate name 901 is saved as one piece of attribute information in the conceptual feature group 1111. Since the same applies to corporate name 902, date 903 and 904, medical institution name 905 and 906, and product name 907 that are pieces of attribute information, description thereof is omitted. Moreover, for example, in the case where the end user inputs the attribute character string samples 17 illustrated in FIG. 8B in the processing sequence of (d) illustrated in FIG. 3B, "Inawashiro Transport" is associated with the company name 811 as illustrated in FIG. 8B. As a result, as in the attribute information table 18 illustrated in FIG. 9B, for example, company name 911 is saved as the attribute information in the conceptual feature group 1111. Since the same applies to company name 912, 915, and 916, date 913 and 914, and product name 917 that are pieces of attribute information, description thereof is omitted.

After S514 or in the case where the second learning unit 38 determines that the conceptual feature groups are not the same in S512, in S515, the second learning unit 38 determines whether all conceptual feature groups have been selected in S512. In the case where the second learning unit 38 determines that not all of the conceptual feature groups have been selected in S515, that is in the case where the second learning unit 38 determines that an unprocessed conceptual feature group is left, the learning apparatus 3 returns to the process of S511 and continues the processes. In the case where the second learning unit 38 determines that all conceptual feature groups have been selected in S515, that is in the case where the second learning unit 38 determines that no unprocessed conceptual feature group is left, the learning apparatus 3 terminates the processes of the flowchart illustrated in FIG. 8B to complete the process of S504. After S504, in S505, the table output unit 39 outputs the attribute information table 18 generated in S504 to the information processing apparatus 4. Specifically, the table output unit 39 transmits the attribute information table 18 to the information processing apparatus 4 via the network 5 to save the attribute information table 18 in the storage 265 included in the information processing apparatus 4.

<Process of Setting Extraction Target>

Figure 6:
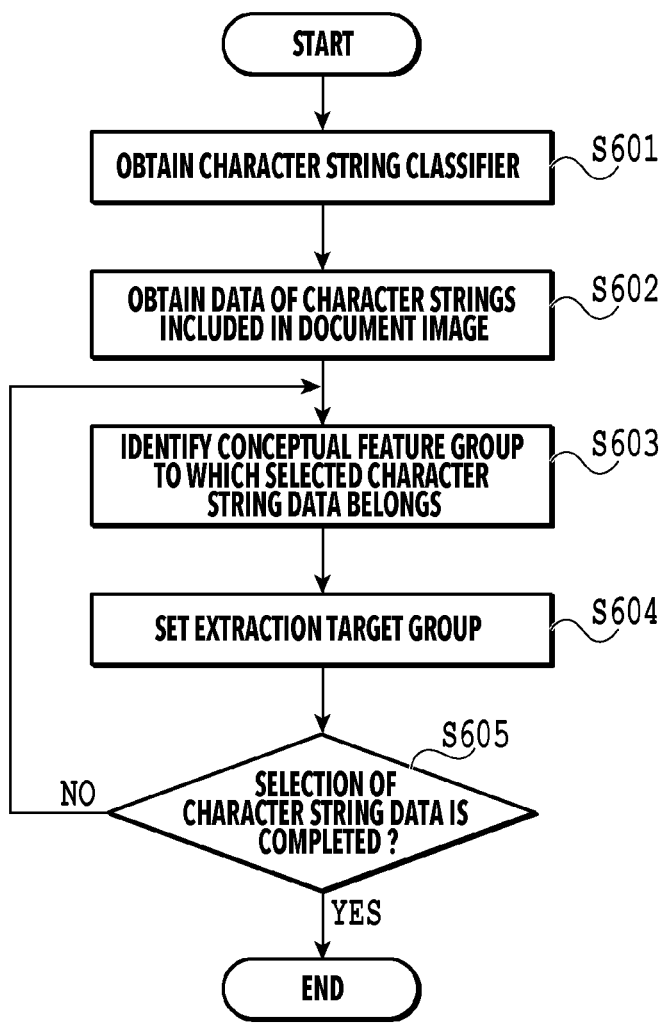
FIG. 6 is a flowchart illustrating a flow example of a part of a process in the information processing apparatus according to the first embodiment.

A flow of a process in which the information processing apparatus 4 sets the extraction target group in (c) or (e) illustrated in FIG. 3A or 3B is described with reference to FIG. 6. FIG. 6 is a flowchart illustrating an example of the flow of the process in which the information processing apparatus 4 according to the first embodiment sets the extraction target group. Note that, in the description of FIG. 6, reference sign "S" means step. Moreover, for example, a program configured to execute each step illustrated in FIG. 6 is stored in the ROM 262, the RAM 264, or the storage 265 of the information processing apparatus 4 and is executed by the CPU 261 of the information processing apparatus 4.

First, in S601, the classifier obtaining unit 41 obtains the character string classifier 15. Specifically, for example, the classifier obtaining unit 41 obtains the character string classifier 15 by reading the character string classifier 15 saved in the storage 265. Next, in S602, the processing image obtaining unit 42 first obtains a document image 13 as an image corresponding to a document used to designate the extraction target group (hereinafter, referred to as "extraction target document"). Specifically, the processing image obtaining unit 42 obtains the document image 13 by receiving data of the document image 13 transmitted by the image input apparatus 2. The processing image obtaining unit 42 may obtain the document image 13 by reading the data of the document image 13 from a storage device such as the storage 265 in which the data of the document image 13 is stored in advance. Next, the character string obtaining unit 43 obtains one or more pieces of data of character strings included in the document image 13 obtained by the processing image obtaining unit 42, by executing the OCR process or the like on the document image 13. Then, the character string obtaining unit 43 obtains character string data corresponding to a character string designated by an operation input by a user such as the engineer or the end user, from among the one or more pieces of data of character strings included in the document image 13.

Figure 12A:
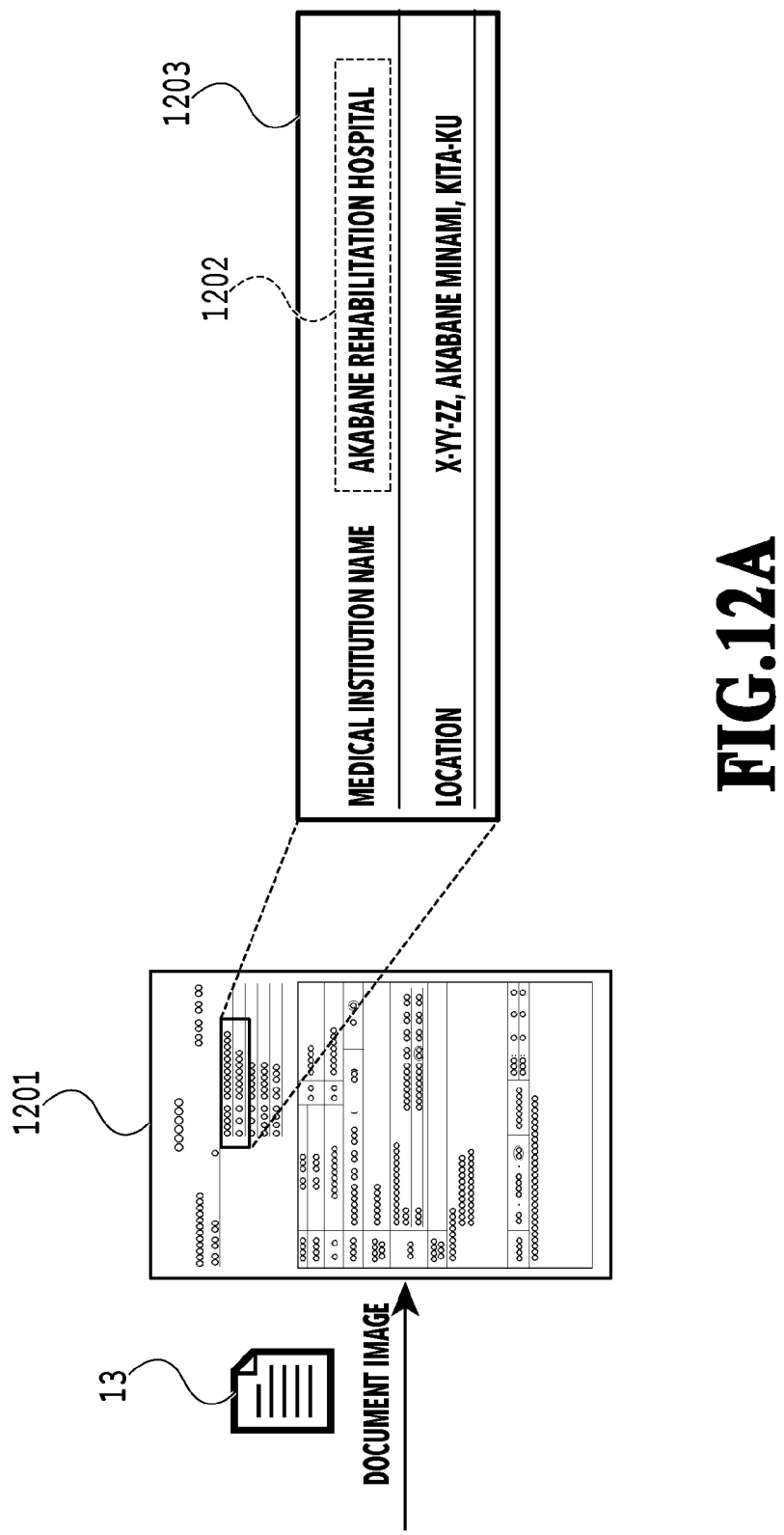
FIG. 12A is a diagram illustrating an example of a document image and FIG. 12B is an explanatory view for explaining an example of a setting screen.
Figure 12B:
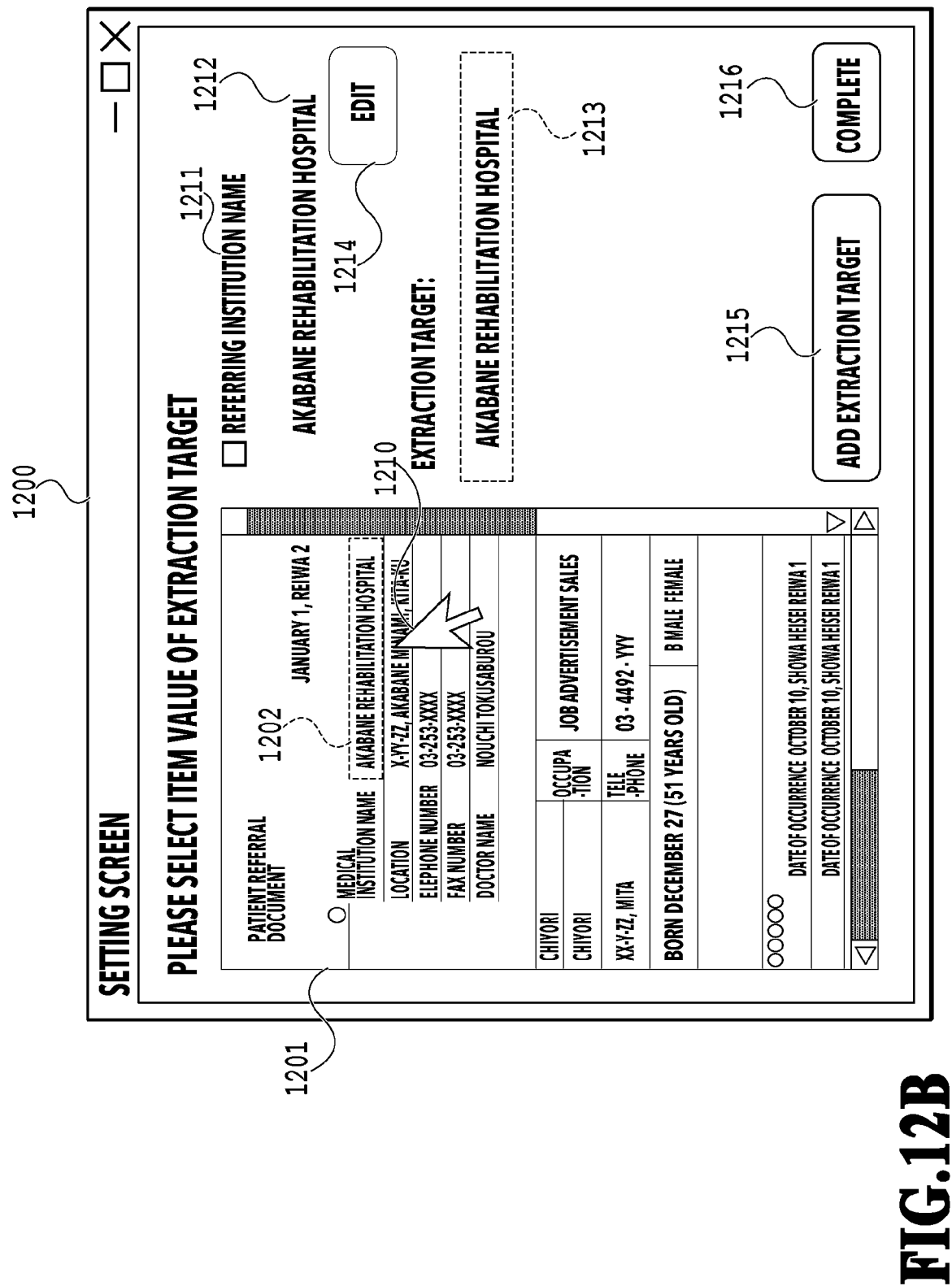

A setting screen in which the user designates a desired character string from among the one or more pieces of data of character strings included in the document image 13 is described with reference to FIGS. 12A and 12B. FIGS. 12A and 12B are explanatory diagrams for explaining an example of the setting screen according to the first embodiment. Specifically, FIG. 12A is a diagram illustrating an example of the document image 13 obtained by the processing image obtaining unit 42 according to the first embodiment. FIG. 12A illustrates an image 1201 visualizing the document image 13 and an image 1203 illustrating a partial image region of the image 1201 in an enlarged manner. Moreover, in the image 1203, there is illustrated a character region 1202 of a proper noun (medical institution name) "Akabane Rehabilitation Hospital" representing an item value of a medical institution name representing an item.

FIG. 12B is a diagram illustrating an example of a setting screen 1200 that is outputted to and displayed on a display device by the information processing apparatus 4 according to the first embodiment. Specifically, the image 1201 illustrated in FIG. 12A and visualizing the document image 13 is displayed in a preview screen region illustrated in FIG. 12B. Moreover, the character region 1202 of "Akabane Rehabilitation Hospital" that is the item value corresponding to the medical institution name representing the item is depicted in the image 1201 displayed in the preview screen region illustrated in FIG. 12B. For example, the user selects a desired character region in the image 1201 displayed in the preview screen region illustrated in FIG. 12B. This selection is achieved by, for example, performing position designation 1210 on the character region by using a pointer or the like. For example, in the case where the user selects the character region 1202 corresponding to "Akabane Rehabilitation Hospital" by performing the position designation, an image 1213 corresponding to the character region 1202 is obtained and displayed as an item value of "extraction target:". Moreover, in the setting screen 1200 illustrated in FIG. 12B, character string data obtained as a result of the OCR process on the image 1213 is displayed as an item value 1212 corresponding to an item 1211 represented by "referring institution name".

Note that the item 1211 represented by "referring institution name" is an item preset by a user such as the engineer. The item 1211 may be an item additionally set by a user such as the end user by pressing of an add button 1215 for adding an item. In the case where the user determines that the character string data such as the OCR result displayed as the item value 1212 in the setting screen of FIG. 12B is incorrect, the user can press an edit button 1214 to correct the character string data. In the case where the user completes selecting all pieces of desired character string data from among the one or more pieces of data of character strings included in the document image 13, the user presses a complete button 1216 in the setting screen illustrated in FIG. 12B to terminate the display.

After S602, in S603, first, the vector conversion unit 44 converts each of the one or more pieces of character string data selected by the user in S602, to a feature vector. Next, the conceptual feature group identification unit 45 inputs the feature vector converted by the vector conversion unit 44 into the character string classifier 15 obtained by the classifier obtaining unit 41 and identifies a conceptual feature group to which the character string data corresponding to the inputted feature vector belongs. After S603, in S604, the extraction target setting unit 46 sets the conceptual feature group identified by the conceptual feature group identification unit 45 as the extraction target group and outputs the extraction target group information to a storage device such as the storage 265 to store and save the extraction target group information in the storage device. In this example, the extraction target group information is information by which the conceptual feature group can be identified and is, for example, group ID information.

After S604, in S605, for example, the character string obtaining unit 43 determines whether the selection of data of character string to be designated as the extraction target is completed or not, based on an operation input by a user such as the engineer or the end user. Specifically, for example, in the case where a new character region is selected in the image 1201 displayed in the preview screen region illustrated in FIG. 12B, the character string obtaining unit 43 determines that the selection of data of character string to be designated as the extraction target is not completed. In the case where the character string obtaining unit 43 determines that the selection of data of character string to be designated as the extraction target is not completed, the information processing apparatus 4 returns to the process of S603 and executes the processes of S603 to S605 to add the extraction target group information corresponding to the data of character string that is newly designated. Specifically, in this case, the information processing apparatus 4 repeatedly executes the processes of S603 to S605 to add the extraction target group information until the character string obtaining unit 43 determines that the selection of data of character string to be designated as the extraction target is completed.

Meanwhile, for example, in the case where the complete button 1216 in the setting screen illustrated in FIG. 12B is pressed, the character string obtaining unit 43 determines that the selection of data of character string to be designated as the extraction target is completed. In the case where the character string obtaining unit 43 determines that the selection of data of character string to be designated as the extraction target is completed, the information processing apparatus 4 terminates the processes of the flowchart illustrated in FIG. 6 and waits until the processing image obtaining unit 42 obtains a new document image 13. In the case where the processing image obtaining unit 42 obtains a new document image 13, the information processing apparatus 4 executes the processes of the flowchart illustrated in FIG. 6 again. Note that, in this case, the information processing apparatus 4 may skip the process of S601 and execute only the processes of S602 and beyond among the processes of the flowchart illustrated in FIG. 6.

<Process of Extracting Candidate Character Strings>

Figure 7A:
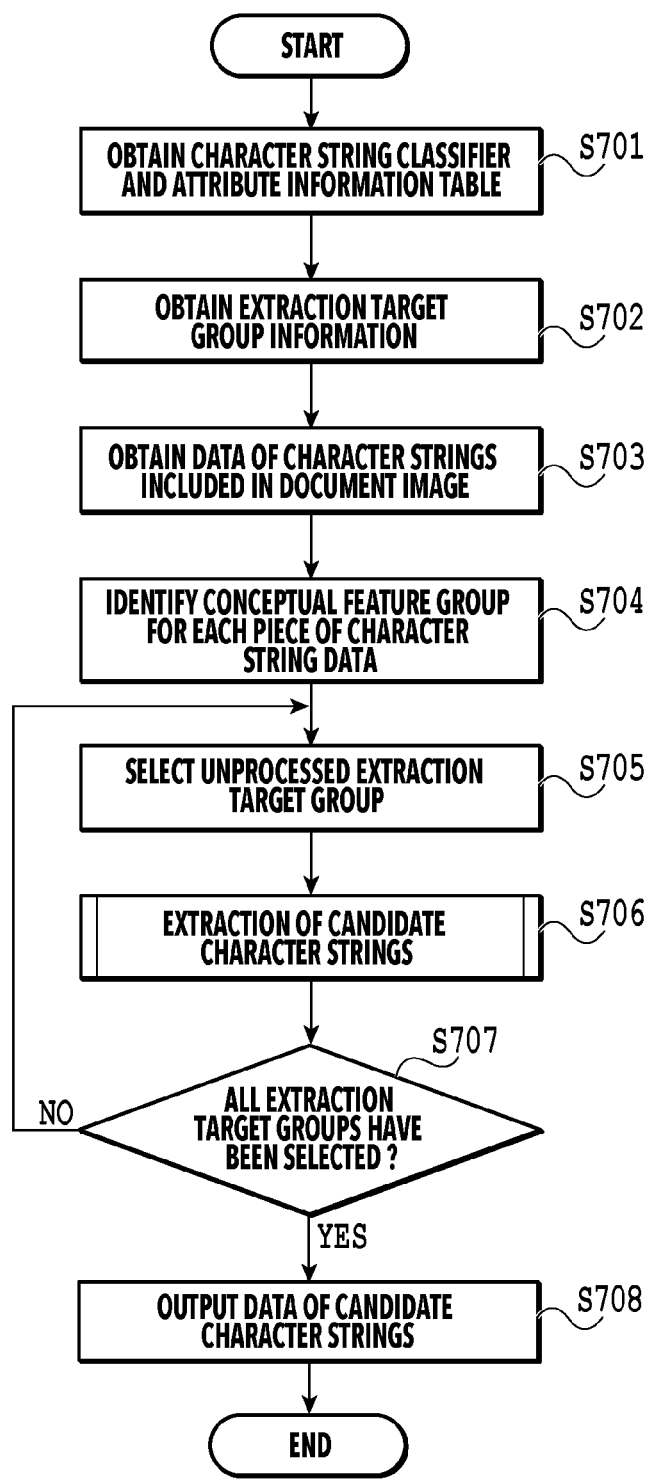
FIGS. 7A and 7B are flowcharts illustrating a flow example of another part of the process in the information processing apparatus according to the first embodiment.
Figure 7B:
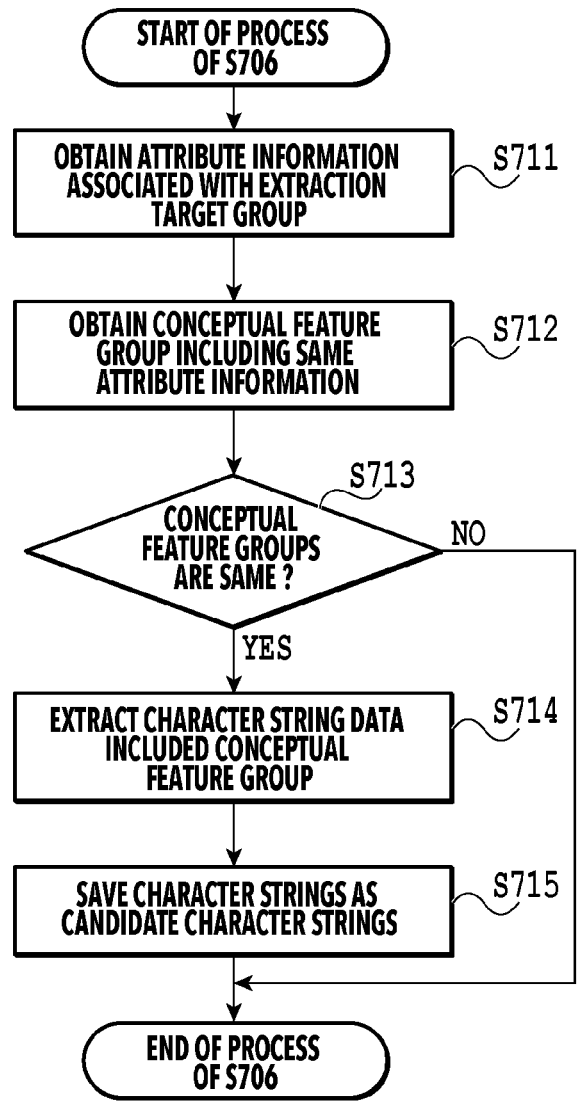

A flow of a process in which the information processing apparatus 4 extracts the data of candidate character strings from among the one or more pieces of data of character strings included in the document image 13 in the processing sequence of (f) illustrated in FIG. 3B is described with reference to FIGS. 7A and 7B. FIG. 7A is a flowchart illustrating an example of the flow of the process in which the information processing apparatus 4 according to the first embodiment extracts the data of candidate character strings from among the one or more pieces of data of character strings included in the document image 13. FIG. 7B is a flowchart illustrating an example of a process of S706 illustrated in FIG. 7A. Note that, in the description of FIGS. 7A and 7B, reference sign "S" means step. Moreover, for example, a program configured to execute each step illustrated in FIGS. 7A and 7B is stored in the ROM 262, the RAM 264, or the storage 265 of the information processing apparatus 4 and is executed by the CPU 261 of the information processing apparatus 4.

First, in S701, the classifier obtaining unit 41 obtains the character string classifier 15. Specifically, the classifier obtaining unit 41 obtains the character string classifier 15 by reading the character string classifier 15 saved in the storage 265 included in the information processing apparatus 4. Next, in S702, the candidate extraction unit 47 obtains the extraction target group information saved in S604 illustrated in FIG. 6. Note that, in the case where there are multiple pieces of extraction target group information saved in S604, the candidate extraction unit 47 obtains the multiple pieces of extraction target group information. Next, in S703, the processing image obtaining unit 42 first obtains a document image 13 as an image corresponding to a document from which the data of candidate character strings is to be extracted (hereinafter, referred to as "processing target document"). Specifically, for example, the processing image obtaining unit 42 obtains the document image 13 by receiving data of the document image 13 transmitted by the image input apparatus 2. The processing image obtaining unit 42 may obtain the document image 13 by reading the data of the document image 13 from a storage device such as the storage 265 in which the data of the document image 13 is stored in advance. Next, the character string obtaining unit 43 obtains one or more pieces of data of character strings included in the document image 13 obtained by the processing image obtaining unit 42 by executing the OCR process or the like on the document image 13.

After S703, in S704, first, the vector conversion unit 44 converts each of the one or more pieces of character string data obtained by the character string obtaining unit 43 in S703, to a feature vector. Next, the conceptual feature group identification unit 45 inputs the feature vector converted by the vector conversion unit 44 into the character string classifier 15 obtained by the classifier obtaining unit 41 in S701 for each piece of character string data. Then, the conceptual feature group identification unit 45 receives a result outputted by the character string classifier 15 for each input and identifies a conceptual feature group to which the character string data corresponding to the inputted feature vector belongs for each piece of character string data. In the following description, the conceptual feature group identified by the conceptual feature group identification unit 45 is referred to as identified conceptual feature group. After S704, in S705, the candidate extraction unit 47 selects one piece of unprocessed extraction target group information from among all pieces of extraction target group information obtained in S702. Next, in S706, the candidate extraction unit 47 extracts a candidate character string corresponding to the extraction target group indicated by the extraction target group information selected in S705.

The process of S706 is described with reference to FIG. 7B. First, in S711, the candidate extraction unit 47 refers to the attribute information table 18 saved in the storage 265 in S313 or S334 (that is S505) and obtains the attribute information corresponding to the extraction target group selected in S705. Note that the attribute information table 18 saved in the storage 265 is read in advance from the storage 265 by the table obtaining unit 49 and is temporarily stored in the RAM 264. For example, in the case where the conceptual feature group corresponding to the item 1211 (referring institution name) is selected as the extraction target group in S604, the candidate extraction unit 47 obtains the attribute information associated with the conceptual feature group 1115 in the attribute information table 18. Specifically, for example, the candidate extraction unit 47 refers to the conceptual feature group 1115 in the attribute information table 18 illustrated in FIG. 9A and obtains the medical institution name 905 as the attribute information.

Next, in S712, the candidate extraction unit 47 refers to the attribute information table 18 and obtains information indicating one or more conceptual feature groups (conceptual feature group set) associated with the same attribute information as the attribute information obtained in S711. Specifically, for example, the candidate extraction unit 47 obtains information indicating the conceptual feature group 1115 and the conceptual feature group 1116 associated with the attribute information of medical institution name. Note that, in the case where the attribute information associated with the extraction target group is absent in S711, the candidate extraction unit 47 only needs to obtain only the conceptual feature group 1115 that is the extraction target group, as the conceptual feature group set.

Next, in S713, for each piece of character string data obtained in S703, the candidate extraction unit 47 determines whether the identified conceptual feature group identified in S704 is the same as any of the conceptual feature groups in the conceptual feature group set obtained in S712. In the case where the candidate extraction unit 47 determines that the identified conceptual feature group is the same as any of the conceptual feature groups in S713, in S714, the candidate extraction unit 47 extracts the character string data that belongs to the identified conceptual feature group identified in S704 and determined to be the same as any of the conceptual feature groups in the conceptual feature group set. Next, in S715, the candidate extraction unit 47 saves the character string data extracted in S714 as data of candidate character strings. After S715 or in the case where the candidate extraction unit 47 determines that the identified conceptual feature group is the same as none of the conceptual feature groups in S713, the information processing apparatus 4 terminates the processes of the flowchart illustrated in FIG. 7B and completes the process of S706.

After S706, in S707, the candidate extraction unit 47 determines whether all extraction target group have been selected. In the case where the candidate extraction unit 47 determines that not all of the extraction target groups have been processed in S707, that is an unprocessed extraction target group is left, the candidate extraction unit 47 returns to the process of S705. In this case, the candidate extraction unit 47 repeatedly executes the processes of S705 to S707 until the candidate extraction unit 47 determines that all extraction target groups have been processed in S707. In the case where the candidate extraction unit 47 determines that all extraction target groups have been selected in S707, that is no unprocessed extraction target group is left, in S708, the candidate output unit 48 outputs all saved pieces of data of candidate character strings as extraction results. Specifically, for example, the candidate output unit 48 generates a display image for including the extraction results in a check screen, and displays and outputs this display image on a display device.

Figure 13A:
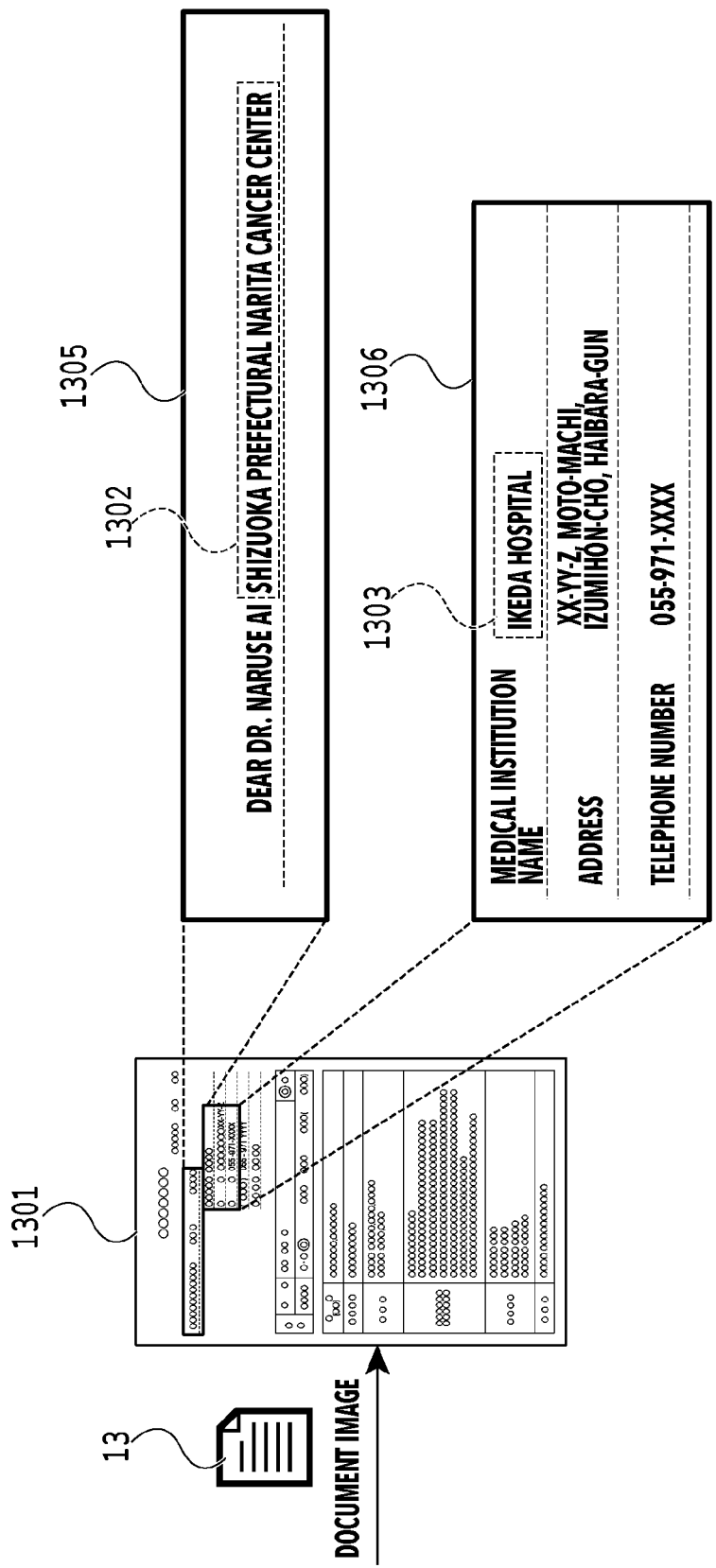
FIG. 13A is a diagram illustrating an example of the document image and FIG. 13B is an explanatory diagram for explaining an example of a check screen.
Figure 13B:
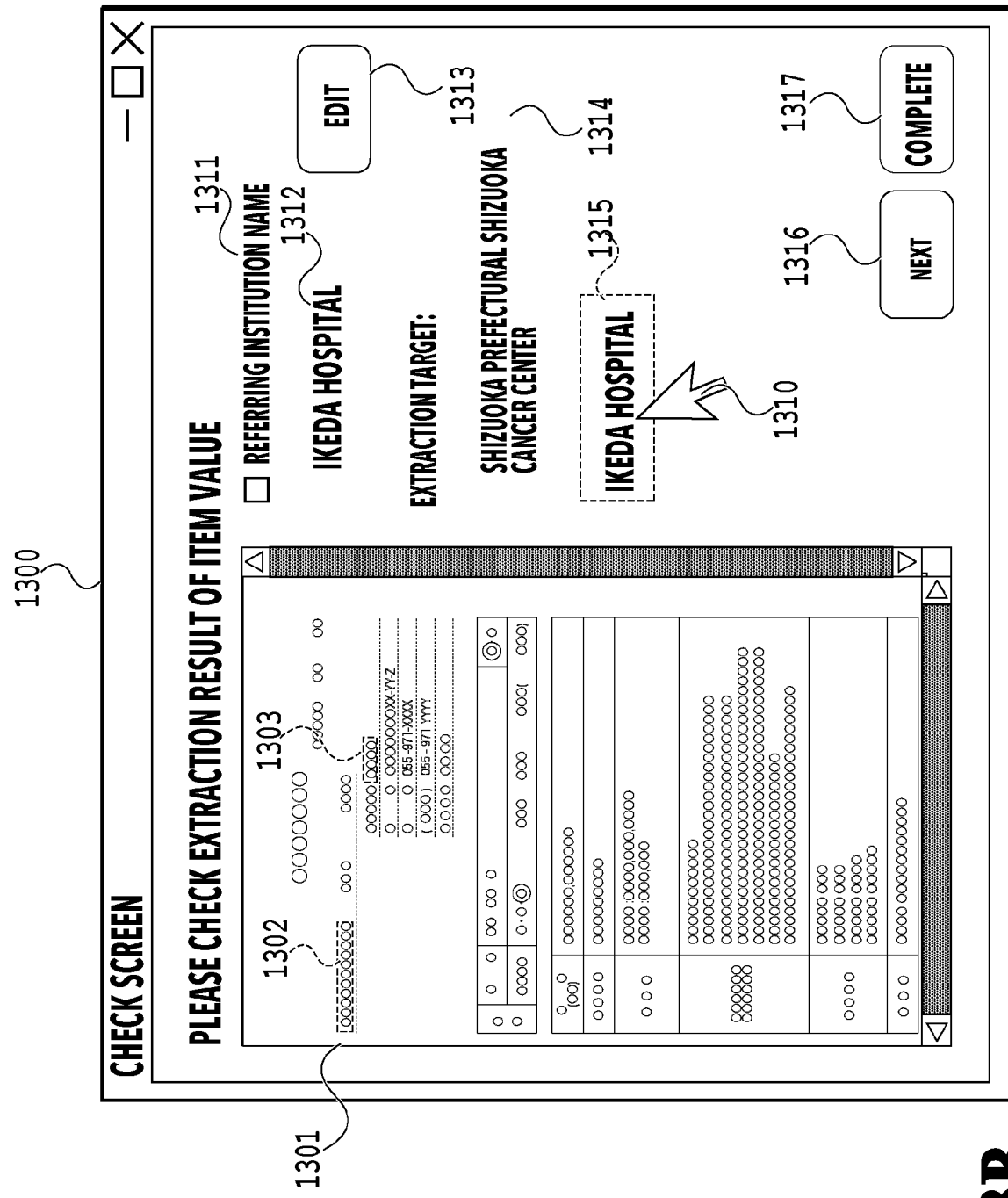

A check screen 1300 outputted by the candidate output unit 48 is described with reference to FIGS. 13A, 13B, 14A, and 14B. FIGS. 13A and 13B are explanatory diagrams for explaining an example of the check screen 1300 outputted by the candidate output unit 48 according to the first embodiment. Specifically, FIG. 13A is a diagram illustrating an example of the document image 13 obtained by the processing image obtaining unit 42 according to the first embodiment. FIG. 13A illustrates a document image 1301 visualizing the document image 13 and images 1305 and 1306 illustrating partial image regions in the image 1301 in an enlarged manner. Moreover, a character region 1302 of "Shizuoka Prefectural Shizuoka Cancer Center" and a character region 1303 of "Ikeda Hospital" of proper nouns (medical institution names) representing item values are illustrated in the images 1305 and 1306. The candidate extraction unit 47 extracts "Shizuoka Prefectural Shizuoka Cancer Center" that is a character string identified to belong to the conceptual feature group 1115 in S704 and "Ikeda Hospital" that is a character string determined to belong to the conceptual feature group 1116 in S704, as the candidate character strings from the document image 1301.

FIG. 13B is a diagram illustrating an example of the check screen 1300 outputted and displayed on a display device by the candidate output unit 48 included in the information processing apparatus 4 according to the first embodiment. Specifically, the document image 1301 illustrated in FIG. 13A is displayed in a preview screen region illustrated in FIG. 13B. Moreover, the character regions 1302 and 1303 are displayed in a checkable state, as the candidate character strings corresponding to the "referring institution name" representing the item, in the document image 1301 displayed in the preview screen region illustrated in FIG. 13B. Furthermore, images 1314 and 1315 corresponding to the character regions 1302 and 1303 are displayed in a checkable state, as item values of "candidate list:". In this example, as described above by using FIG. 12B, the "referring institution name" that is the item of the extraction target is preset by a user such as the engineer or the end user.

For example, the end user selects one of the images 1314 and 1315 in the displayed candidate list by performing an operation input in the check screen 1300 illustrated in FIG. 13B. This selection is achieved by performing position designation 1310 with a pointer or the like. For example, in the case where the user selects the image 1315 by an operation input, character string data 1312 obtained by performing the OCR process on the selected image 1315 is displayed. The user can switch the character string data to be outputted by changing the selected image 1314 or 1315.

Moreover, in the check screen 1300 illustrated in FIG. 13B, in the case where the displayed character string data 1312 that is the displayed result of the OCR process is incorrect, the end user can correct the character string data 1312 by pressing an "edit" button 1313. Furthermore, in the case where the information processing apparatus 4 receives pressing of a "next" button 1317 by the end user, the display transitions to a check screen for checking a piece of data of candidate character string obtained next among the one or more pieces of data of character strings included in the document image 13. Moreover, in the case where the information processing apparatus 4 receives pressing of an "end" button 1318 by the end user, output of the candidate character strings for the document image 13 is completed and the check screen is terminated.

Figure 14A:
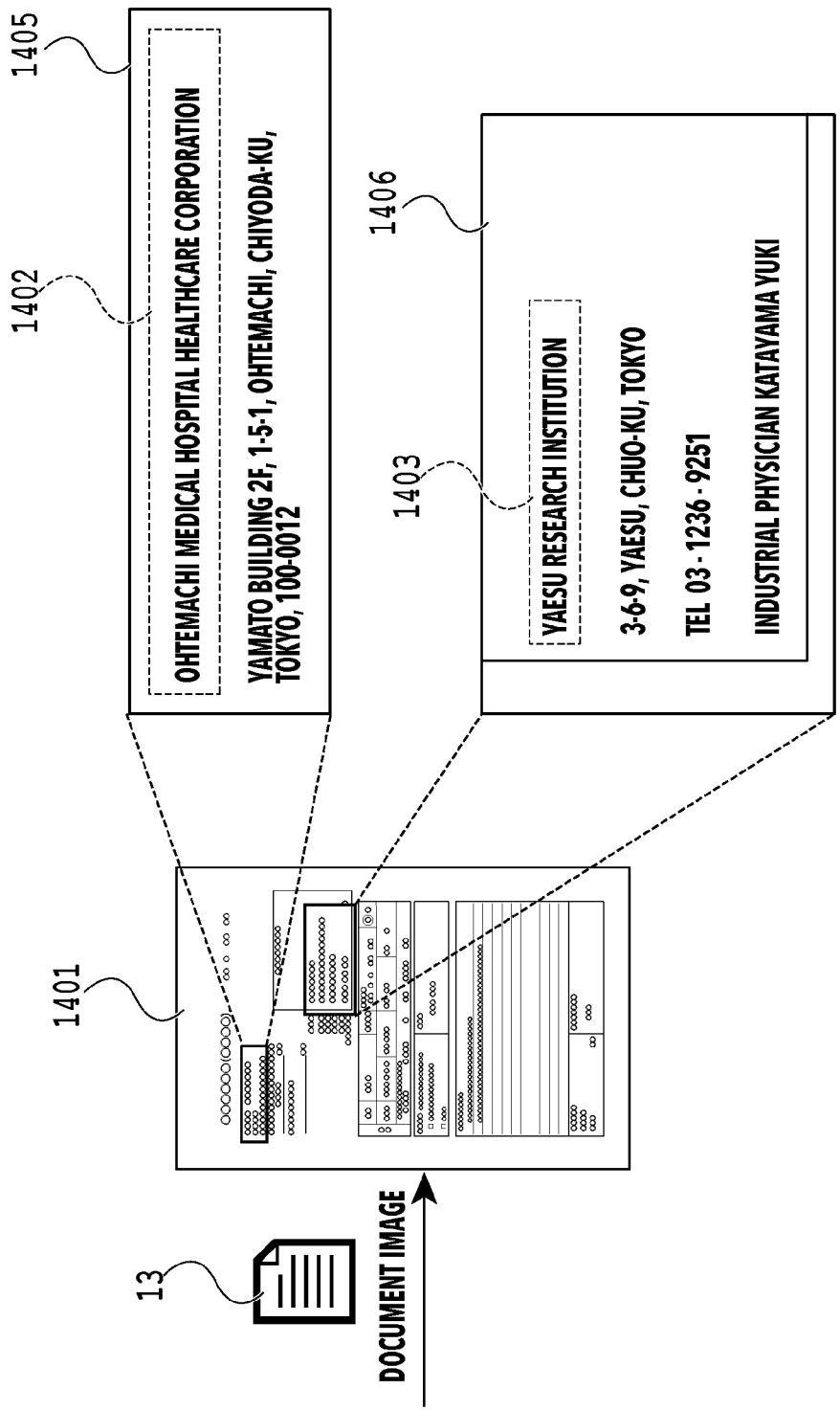
FIG. 14A is a diagram illustrating an example of the document image and FIG. 14B is an explanatory diagram for explaining another example of the check screen.
Figure 14B:
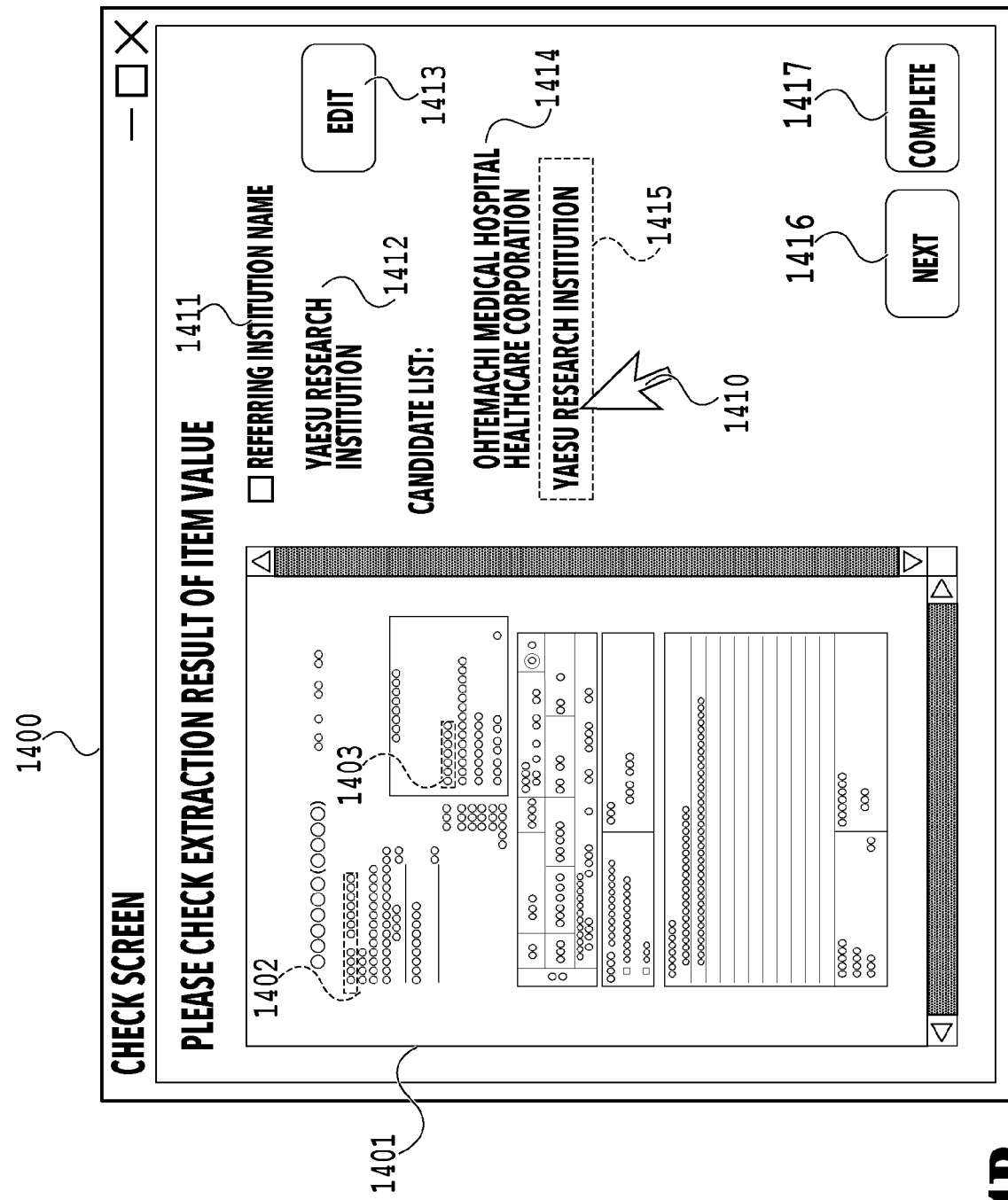

FIGS. 14A and 14B are explanatory diagrams for explaining an example of the check screen 1300 that is different from that in FIGS. 13A and 13B and that is outputted by the candidate output unit 48 according to the first embodiment. Specifically, FIG. 14A is a diagram illustrating an example of the document image 13 obtained by the processing image obtaining unit 42 according to the first embodiment. Moreover, FIG. 14B is a diagram illustrating an example of a check screen 1400 outputted and displayed on a display device by the candidate output unit 48 included in the information processing apparatus 4 according to the first embodiment. FIG. 14A illustrates a document image 1401 visualizing the document image 13 and images 1405 and 1406 illustrating partial image regions in the image 1401 in an enlarged manner. Moreover, a character region 1402 of "Ohtemachi Medical Hospital Healthcare Corporation" and a character region 1403 of "Yaesu Research Institute" of proper nouns (medical institution names) representing item values are illustrated in the images 1405 and 1406.

As in the above description, first, in S711, the candidate extraction unit 47 obtains the attribute information associated with the extraction target group and, in S712, obtains the conceptual feature group set. Next, in S713 and S714, the candidate extraction unit 47 obtains the character string data identified to belong to any of the conceptual feature groups forming the conceptual feature group set obtained in S712 and saves the obtained character string data as the data of candidate character strings. Here, in the case where the candidate extraction unit 47 refers to the attribute information table 18 created by the engineer in S313 and illustrated as an example in FIG. 9A, the candidate extraction unit 47 obtains the attribute information of medical institution name and obtains the conceptual feature groups 1115 and 1116 as the conceptual feature group set. The candidate extraction unit 47 resultantly extracts only the "Ohtemachi Medical Hospital Healthcare Corporation" that is a character string identified to belong to the conceptual feature group 1115 in S704, as the candidate character string from the document image 1401.

Meanwhile, in the case where the candidate extraction unit 47 refers to the attribute information table 18 created by the end user in S334 and illustrated in FIG. 9B, the candidate extraction unit 47 obtains the attribute information of corporation name and obtains the conceptual feature groups 1111, 1112, 1115, and 1116 as the conceptual feature group set. The candidate extraction unit 47 resultantly extracts, in addition to "Ohtemachi Medical Hospital Healthcare Corporation" that is the character string identified to belong to the conceptual feature group 1115, "Yaesu Research Institute" that is a character string identified to belong to the conceptual feature group 1111, as the candidate character strings. Allowing the user to define the attribute character string samples 17 tailored to the task contents enables creation of the attribute information table 18 customized tailored to the task contents of the user, and desired data of candidate character strings can be obtained as output results.

As described above, the information processing apparatus 4 can extract character string data falling into an attribute group desired by the user, from an image of a document such as a semi-fixed form document or a non-fixed form document that has a layout different from a predetermined layout, as a candidate of an item value corresponding to a predetermined item. Specifically, the information processing apparatus 4 can extract character string data, belonging to a conceptual feature group associated with the same attribute information as a conceptual feature group (extraction target group) designated by using an extraction target document, from a processing target document and extract the extracted one or more pieces of character string data as data of candidate character strings. In the first embodiment, regularity in notation of a character string is not used in this extraction. Accordingly, the information processing apparatus 4 can extract not only candidates of items values of items that are noted by regular character strings such as money amount, date, and account number but also candidates of item values corresponding to items that are noted by irregular character strings such as personal name, address, occupation, and relationship, as the candidate character strings. Moreover, character strings to be candidates under an attribute condition desired by the user can be extracted only by defining simple attribute character string samples tailored to task contents of the user.

Moreover, since the information processing apparatus 4 according to the first embodiment can set attribute information corresponding to character strings by defining few character strings for each attribute, there is no need to prepare a dictionary of candidates of item values in advance as a database. Accordingly, cost of maintaining or managing the dictionary can be reduced. Furthermore, the first embodiment employs a method in which item values are directly extracted based on an attribute group to which the item values belong, unlike a method in which item values are extracted based on an item name. Accordingly, the item values can be extracted without being affected by an item name varying in notation such as "personal name" and "name".

Second Embodiment

An information processing system 1 according to a second embodiment (hereinafter, simply referred to as "information processing system 1") is described. A configuration of the information processing system 1 includes the image input apparatus 2, the learning apparatus 3, and the information processing apparatus 4 like the configuration of the information processing system 1 according to the first embodiment illustrated as an example in FIG. 1. Moreover, the image input apparatus 2, the learning apparatus 3, and the information processing apparatus 4 are coupled to be capable of communicating with one another via the network 5.

The information processing apparatus 4 according to the first embodiment is as follows. First, the extraction target group is preset by using the document image 13 corresponding to the extraction target document. Then, the character string data belonging to the conceptual feature group associated with the same attribute information as the extraction target group is extracted from among one or more pieces of data of character strings included in the document image 13 corresponding to the processing target document, as the data of candidate character strings. Meanwhile, the information processing apparatus 4 according to the second embodiment extracts character string data belonging to the conceptual feature group associated with the same attribute information as the extraction target group and character string data belonging to a conceptual feature group associated with the same attribute information as a conceptual feature group located near the extraction target group, as the data of candidate character strings. In the following description, the conceptual feature group located near the extraction target group is referred to as "nearby group".

A configuration of the information processing apparatus 4 is the same as the configuration of the information processing apparatus 4 according to the first embodiment illustrated as an example in FIG. 2C-1. Specifically, the information processing apparatus 4 includes the classifier obtaining unit 41, the processing image obtaining unit 42, the character string obtaining unit 43, the vector conversion unit 44, the conceptual feature group identification unit 45, the extraction target setting unit 46, the candidate extraction unit 47, the candidate output unit 48, and the table obtaining unit 49. However, the candidate extraction unit 47 according to the second embodiment (hereinafter, simply referred to as "candidate extraction unit 47") has different functions from the candidate extraction unit 47 according to the first embodiment. Details of the candidate extraction unit 47 are described later.

Moreover, processes of the units configured to function in the information processing apparatus 4 are performed by hardware such as an ASIC or FPGA incorporated in the information processing apparatus 4 or software using a memory such as a RAM and a processor such as a CPU. Specifically, for example, the information processing apparatus 4 is formed of the computer illustrated as an example in FIG. 2C-2. Note that, since the image input apparatus 2 according to the second embodiment (hereinafter, simply referred to as "image input apparatus 2") and the learning apparatus 3 according to the second embodiment (hereinafter, simply referred to as "learning apparatus 3") are the same as the image input apparatus 2 and the learning apparatus 3 according to the first embodiment, description thereof is omitted.

<Process of Setting Extraction Target>

A flow of a process in which the information processing apparatus 4 according to the second embodiment sets the extraction target group from the document image 13 in the processing sequence of (c) or (e) illustrated in FIG. 3A or 3B is described with reference to the flowchart illustrated in FIG. 6. Note that description is given below of only the steps that are different from the processes in the information processing apparatus 4 according to the first embodiment. Since, S601, S602, and S605 are similar to the processes in the information processing apparatus 4 according to the first embodiment, description thereof is omitted.

In the information processing apparatus 4 according to the second embodiment (hereinafter, simply referred to as "information processing apparatus 4"), in S603, the conceptual feature group identification unit 45 identifies the conceptual feature group to which the character string data belongs and, in S604, the extraction target setting unit 46 sets the extraction target group. In this example, it is assumed that, in the case where the extraction target setting unit 46 sets the extraction target group in S604, the extraction target setting unit 46 calculates barycentric positions of all conceptual feature groups by a process similar to the process of S405 and calculates a similarity based on a distance between each of the barycentric positions and a feature vector corresponding to the character string. The extraction target setting unit 46 selects a predetermined number of conceptual feature groups in the ascending order of the distance or the descending order of the similarity, from among all conceptual feature groups, and thereby sets the predetermined number of extraction target groups. The extraction target setting unit 46 may set a conceptual feature group whose distance is shorter than a predetermined threshold or a conceptual feature group whose similarity is higher than a predetermined threshold as the extraction target group. Moreover, the extraction target setting unit 46 can set multiple extraction target groups with priorities varying from one another by giving priorities corresponding to the similarities, for example, giving priorities in the descending order of the similarities, to the conceptual feature groups having similarities of a predetermined value or higher. Specifically, for example, the extraction target setting unit 46 first calculates a distance between a feature vector corresponding to data of character string of "Nara Electrics" illustrated in FIG. 11C and a barycenter position of each of the conceptual feature groups 1111 to 1117. Then, for example, the extraction target setting unit 46 sets three conceptual feature groups 1111, 1115, and 1116 in the descending order of similarity, that is in the ascending order of the distance from the feature vector, as the extraction target groups.

<Process of Extracting Candidate Character Strings>

Figure 10:
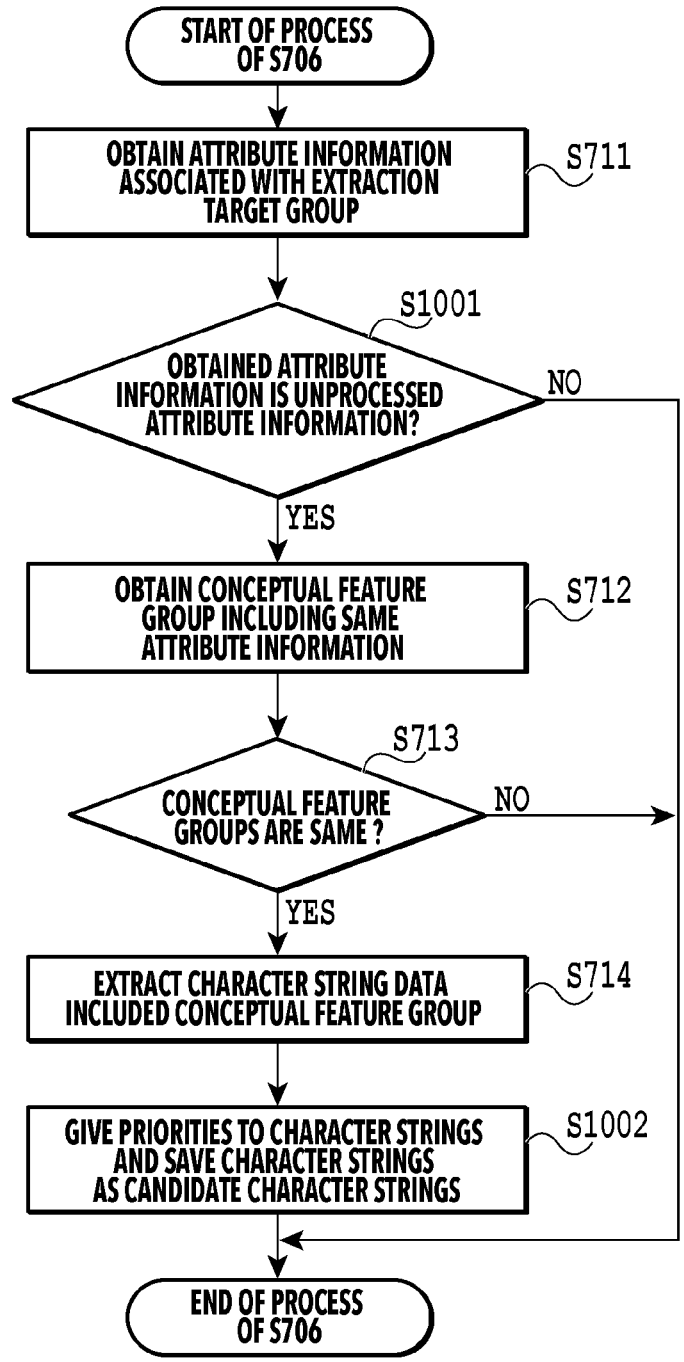
FIG. 10 is a flowchart illustrating a flow example of a part of a process in the information processing apparatus according to the second embodiment.

A flow of a process in which the information processing apparatus 4 according to the second embodiment extracts the data of candidate character strings from the document image 13 in the processing sequence of (f) illustrated in FIG. 3B is described with reference to FIG. 10 and the flowchart illustrated in FIG. 7A. FIG. 10 is a flowchart illustrating an example of the flow of the process of S706 illustrated in FIG. 7A. Note that, in the description of FIG. 10, reference sign "S" means step. Moreover, a program configured to execute each step illustrated in FIG. 10 is stored in the ROM 262, the RAM 264, or the storage 265 of the information processing apparatus 4 and is executed by the CPU 261 of the information processing apparatus 4. Note that, for FIG. 7A, description is given below of only the steps that are different from the processes in the information processing apparatus 4 according to the first embodiment. Moreover, detailed description of the steps denoted in FIG. 10 by the same reference signs as those in FIG. 7B is omitted.

First, the information processing apparatus 4 executes the processes of S701 to S704 illustrated in FIG. 7A. Since the processes from S701 to S704 are the same as those in the first embodiment, description thereof is omitted. After S704, in S705, the candidate extraction unit 47 selects one piece of unprocessed conceptual feature group information from among all pieces of extraction target group information obtained in S702. In this case, the candidate extraction unit 47 selects the conceptual feature groups 1111, 1115, and 1116, which are in the descending order of priority, in this order from among the extraction target groups obtained in S604. After S705, the process of S706, that is the process of the flowchart illustrated in FIG. 10 is executed. First, in S711, the candidate extraction unit 47 refers to the attribute information table 18 and obtains the attribute information associated with the extraction target group selected in S705. In this example, it is assumed that the candidate extraction unit 47 refers to the attribute information table 18 illustrated in FIG. 9A. Next, in S1001, the candidate extraction unit 47 determines whether the attribute information obtained in S711 is unprocessed attribute information or not. Specifically, in the case where the extraction target group selected in S705 is the conceptual feature group 1111 or 1115, the attribute information is corporation name or medical institution name and is unprocessed attribute information. Meanwhile, in the case where the extraction target group selected in S705 is the conceptual feature group 1116, the attribute information associated with the conceptual feature group 1116 is the same attribute information as the attribute information of medical institution name that has been already processed in the occasion where the conceptual feature group 1115 was selected.

In the case where the candidate extraction unit 47 determines that the attribute information is not unprocessed attribute information in S1001, the information processing apparatus 4 terminates the processes of the flowchart illustrated in FIG. 10 and completes the process of S706. In the case where the candidate extraction unit 47 determines that the attribute information is unprocessed attribute information in S1001, the information processing apparatus 4 executes the processes of S712 to S714. Since the processes of S712 to S714 are the same as those in the first embodiment, description thereof is omitted. After S714, in S1002, the information processing apparatus 4 gives a priority to the character string data extracted in S714 and saves the character string data as the data of candidate character string. The priority is given to the data of candidate character string based on the priority given to the conceptual feature group set as the extraction target group. Specifically, a higher priority is given to the data of character string belonging to the conceptual feature group that is associated with the attribute information of corporate name and to which a higher first priority is given. Moreover, a lower priority is given to the data of character string belonging to the conceptual feature group that is associated with the attribute information of medical institution name and to which a lower second priority is given. Then, these pieces of data of character strings are saved as the data of candidate character strings to which the priorities are given. After S1002, the information processing apparatus 4 terminates the processes of the flowchart illustrated in FIG. 10 and completes the process of S706. Since the processes of S707 and S708 are the same as those in the first embodiment, description thereof is omitted.

As described above, the information processing apparatus 4 can extract character string data identified to belong to the conceptual feature group associated with the same attribute information as the extraction target group and character string data identified to belong to the conceptual feature group associated with the same attribute information as the nearby group, as the candidate character strings. Specifically, even in the case where the extraction target group is similar to multiple conceptual feature groups and extraction of candidate character strings to be extracted is difficult, the information processing apparatus 4 can extract also the character string data belonging to the conceptual feature group associated with the same attribute information as the nearby group, as the data of candidate character strings. Accordingly, omission of extraction of the data of candidate character strings can be reduced also in this case.

Third Embodiment

An information processing system 1 according to a third embodiment (hereinafter, simply referred to as "information processing system 1") is described. A configuration of the information processing system 1 includes the image input apparatus 2, the learning apparatus 3, and the information processing apparatus 4 like the configuration of the information processing system 1 according to the first embodiment illustrated as an example in FIG. 1. Moreover, the image input apparatus 2, the learning apparatus 3, and the information processing apparatus 4 are coupled to be capable of communicating with one another via the network 5.

The information processing apparatus 4 according to the first and second embodiments is an apparatus that extracts the data of candidate character strings by referring to the attribute information table 18 in which one representative piece of attribute information is associated with one conceptual feature group. Meanwhile, the information processing apparatus 4 according to the third embodiment (hereinafter, simply referred to as "information processing apparatus 4") is an apparatus that extracts the data of candidate character strings by referring to the attribute information table 18 in which multiple pieces of attribute information are associated with one conceptual feature group.

A configuration of the learning apparatus 3 is the same as the configuration of the learning apparatus 3 according to the first embodiment illustrated as an example in FIG. 2B-1. Specifically, the learning apparatus 3 includes the image sample obtaining unit 31, the character string obtaining unit 32, the vector conversion unit 33, the first learning unit 34, the classifier generation unit 35, the classifier output unit 36, the attribute sample obtaining unit 37, the second learning unit 38, and the table output unit 39. However, the second learning unit 38 according to the third embodiment (hereinafter, simply referred to as "second learning unit 38") has functions different from the second learning unit 38 according to the first and second embodiments. Details of the second learning unit 38 are described later.

A configuration of the information processing apparatus 4 is the same as the configuration of the information processing apparatus 4 according to the first embodiment illustrated as an example in FIG. 2C-1. Specifically, the information processing apparatus 4 includes the classifier obtaining unit 41, the processing image obtaining unit 42, the character string obtaining unit 43, the vector conversion unit 44, the conceptual feature group identification unit 45, the extraction target setting unit 46, the candidate extraction unit 47, the candidate output unit 48, and the table obtaining unit 49. However, the candidate extraction unit 47 according to the third embodiment (hereinafter, simply referred to as "candidate extraction unit 47" has functions different from the candidate extraction unit 47 according to the first and second embodiments. Details of the candidate extraction unit 47 are described later.

Processes of the units configured to function in the learning apparatus 3 are performed by hardware such as an ASIC or FPGA incorporated in the learning apparatus 3 or software using a memory such as a RAM and a processor such as a CPU. Moreover, processes of the units configured to function in the information processing apparatus 4 are performed by hardware such as an ASIC or FPGA incorporated in the information processing apparatus 4 or software using a memory such as a RAM and a processor such as a CPU. Specifically, for example, the learning apparatus 3 is formed of the computer illustrated as an example in FIG. 2B-2 and the information processing apparatus 4 is formed of the computer illustrated as an example in FIG. 2C-2. Since the image input apparatus 2 according to the third embodiment (hereinafter, simply referred to as "image input apparatus 2") is the same as the image input apparatus according to the first or second embodiment, description thereof is omitted.

<Process of Generating Attribute Information Table>

A flow of a process in which the learning apparatus 3 according to the third embodiment (hereinafter, simply referred to as "learning apparatus 3") generates the attribute information table 18 in step of (b) or (d) illustrated in FIG. 3A or 3B is described with reference to FIGS. 5A and 5B. In this section, for FIGS. 5A and 5B, description is given of only the steps that are different from the processes of the learning apparatus 3 according to the first or second embodiment.

First, in S501, the attribute sample obtaining unit 37 obtains the attribute character string samples 17 and the second learning unit 38 obtains the pieces of character string data included in the attribute character string samples 17. In this example, description is given assuming that the attribute sample obtaining unit 37 obtains the attribute character string samples 17 illustrated in FIG. 8C. In the attribute character string samples 17 illustrated in FIG. 8C, the attribute information of food 821, beverage 822, alcohol 823, and expendable 824 are defined and set and pieces of character string data corresponding to each piece of attribute information are set. The second learning unit 38 obtains the pieces of character string data corresponding to each piece of attribute information. Next, in S502 and S503, the vector conversion unit 33 converts each piece of character string data obtained in S501 to a feature vector and identifies the conceptual feature group to which each piece of character string data belongs by using the character string classifier 15. The pieces of character string data included in the attribute character string samples 17 illustrated in FIG. 8C are classified into the conceptual feature group 1117 illustrated in FIG. 11C and conceptual feature groups not illustrated in FIG. 11C. Next, in S504, the second learning unit 38 generates the attribute information table 18 based on the pieces of character string data obtained in S501 and the conceptual feature groups identified in S503. Specifically, the second learning unit 38 executes the processes of the flowchart illustrated in FIG. 5B.

First, in S511, the second learning unit 38 selects one unprocessed conceptual feature group from among all conceptual feature groups into which the pieces of character string data are classified by the character string classifier. In this example, description is given assuming that the conceptual feature group 1117 is selected. Next, in S512, for each piece of character string data, the second learning unit 38 determines whether the conceptual feature group of the character string data identified in S503 is the same as the conceptual feature group selected in S511. In the case where the second learning unit 38 determines that the conceptual feature groups are the same in S512, in S513, the second learning unit 38 obtains the attribute information associated with each of the one or more pieces of character string data identified to belong to the conceptual feature group determined to be the same, based on the attribute character string samples 17. In this example, the second learning unit 38 obtains "beverage" and "alcohol" that are the attribute information associated with "juice", "tea", and "sake" that are character strings included in the conceptual feature group 1117.

Next, in S514, the second learning unit 38 determines pieces of attribute information to be associated with the conceptual feature group selected in S511 and saves the determined pieces of attribute information and information indicating the conceptual feature group selected in S511 in association with each other. In the present embodiment, a priority is given to each of the multiple pieces of attribute information obtained in S513, depending on a frequency of appearance of each piece of attribute information. In this example, the pieces of attribute information of "beverage" and "alcohol", which are in the descending order of frequency of appearance, are obtained. Accordingly, pieces of data 917 of character strings corresponding to "beverage" and "alcohol" are saved in the attribute information table 18 illustrated in FIG. 9C. Note that the method of determining the priority is not limited to the descending order of frequency of appearance and a high priority may be given to such attribute information that feature vectors corresponding to the pieces of characters string data associated with the attribute information are distributed over a wide range in a region of the conceptual feature group. Moreover, the method may be such that the attribute information included in the attribute character string samples 17 defined by the end user is given a high priority and the attribute information included in the attribute character string samples defined by the engineer is given a low priority. Specifically, for example, in the case where the second learning unit 38 obtains, S513, different pieces of attribute information of corporate name that is illustrated in FIG. 9A and defined by the engineer and company name that is illustrated in FIG. 9B and defined by the end user, a higher priority is given to the attribute information of company name defined by the end user. Note that, in the case where the frequency of appearance is the same or in a similar case, the same priority may be given. In the flowcharts illustrated in FIGS. 5A and 5B, since the processes of S514 and beyond are the same as those of the learning apparatus 3 according to the first embodiment, description thereof is omitted.

Process of Extracting Candidate Character Strings>

Figure 15:
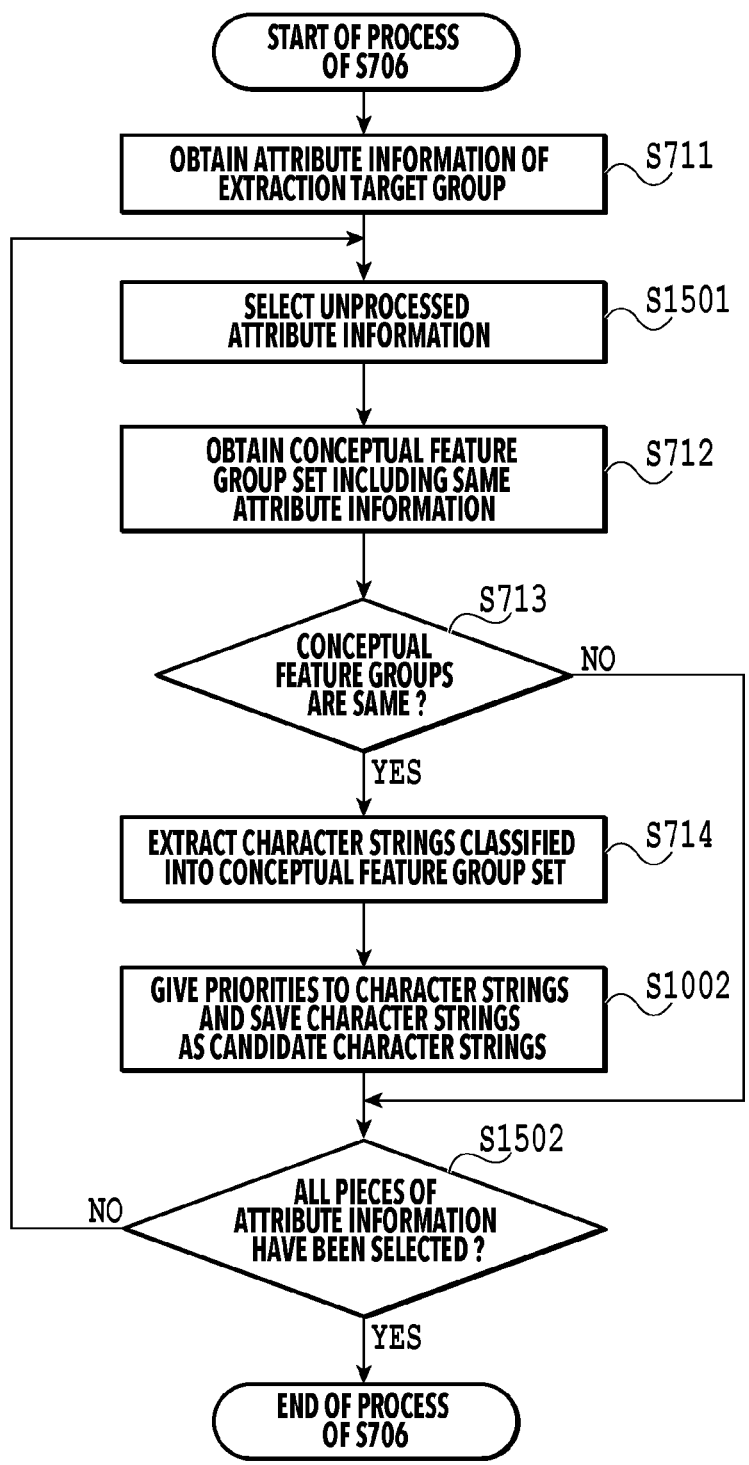
FIG. 15 is a flowchart illustrating a flow example of a part of a process in the information processing apparatus according to the third embodiment.

A flow of a process in which the information processing apparatus 4 according to the third embodiment (hereinafter, simply referred to as "information processing apparatus 4") extracts the candidate character strings as extraction targets from the document image in the processing sequence of (f) in FIG. 3B is described with reference the flowcharts of FIG. 7A and FIG. 15. FIG. 15 is a flowchart illustrating an example of the flow of the process of S706 illustrated in FIG. 7A. Note that, in the description of FIG. 15, reference sign "S" means step. Moreover, a program configured to execute each step illustrated in FIG. 15 is stored in the ROM 262, the RAM 264, or the storage 265 of the information processing apparatus 4 and is executed by the CPU 261 of the information processing apparatus 4. For FIG. 7A, description is given below of only the steps that are different from the processes in the information processing apparatus 4 according to the first embodiment. Moreover, detailed description of the steps denoted in FIG. 15 by the same reference signs as those in FIG. 7B or 10 is omitted.

First, the information processing apparatus 4 executes the processes of S701 to S704 illustrated in FIG. 7A. Since the processes from S701 to S704 are the same as the processes in the information processing apparatus 4 according to the first embodiment, description thereof is omitted. After S704, in S705, the candidate extraction unit 47 selects one piece of unprocessed conceptual feature group information from among all pieces of extraction target group information obtained in S702. After S705, the candidate extraction unit 47 executes the processes of the flowchart illustrated in FIG. 15 as the process of S706. Specifically, first, in S711, the candidate extraction unit 47 obtains the attribute information of the extraction target group. For example, in the case where the conceptual feature group 1117 is selected in S705, the candidate extraction unit 47 refers to the attribute information table 18 illustrated in FIG. 9C and obtains the two pieces of attribute information of beverage and alcohol to which priorities are given. Next, in S1501, the candidate extraction unit 47 selects one piece of unprocessed attribute information from among the pieces attribute information obtained in S711. After S1501, the candidate extraction unit 47 executes the processes of S712 to S714. Since the processes of S712 to S714 are the same as the processes of the candidate extraction unit 47 according to the first embodiment, description thereof is omitted.

After S714, in S1002, the candidate extraction unit 47 saves the character strings based on the priorities given to the attribute information obtained in S711, as candidate character strings to which priorities are given. Specifically, the candidate extraction unit 47 saves the character string data belonging to the conceptual feature group associated with the attribute information of beverage to which the first priority being a higher priority is given, as data of high-ranking character candidate string. Moreover, the candidate extraction unit 47 saves the character string data belonging to the conceptual feature group associated with the attribute information of alcohol to which the second priority being a lower priority is given, as data of low-ranking candidate character string. After S1002, in S1502, the candidate extraction unit 47 determines whether all pieces of attribute information have been processed. In the case where the candidate extraction unit 47 determines that not all pieces of attribute information are processed in S1502, that is unprocessed attribute information is left, the process returns to S1501 and the processes of S1501 to S1502 are repeatedly executed until the candidate extraction unit 47 determines that all pieces of attribute information are processed in S1502. In the case where the candidate extraction unit 47 determines that all pieces of attribute information are processed in S1502, that is no unprocessed attribute information is left, the candidate extraction unit 47 terminates the processes of the flowchart illustrated in FIG. 15 and completes the process of S706. In the flowchart illustrated in FIG. 7A, since the processes of S707 and beyond are the same as those in the information processing apparatus 4 according to the first embodiment, description thereof is omitted.

As described above, even in the case where pieces of candidate string data being candidates of an item value belongs to a conceptual feature group associated with multiple pieces of attribute information, the information processing apparatus 4 can extract a piece of character string data that is more likely to be a candidate and that corresponds to the attribute information, as the high-ranking candidate.

Fourth Embodiment

An information processing system 1 according to a fourth embodiment (hereinafter, simply referred to as "information processing system 1") is described. A configuration of the information processing system 1 includes the image input apparatus 2, the learning apparatus 3, and the information processing apparatus 4 like the configuration of the information processing system 1 according to the first embodiment illustrated as an example in FIG. 1. Moreover, the image input apparatus 2, the learning apparatus 3, and the information processing apparatus 4 are coupled to be capable of communicating with one another via the network 5.

The learning apparatus 3 according to the third embodiment is an apparatus that generates the attribute information table 18 in which multiple pieces of attribute information each given a priority are associated with one conceptual feature group. Meanwhile, the learning apparatus 3 according to a fourth embodiment is an apparatus that updates the character string classifier 15 such that the attribute information table 18 in which one piece of attribute information is associated with one conceptual feature group is generated.

A configuration of the learning apparatus 3 is the same as the configuration of the learning apparatus 3 according to the first embodiment illustrated as an example in FIG. 2B-1. Specifically, the learning apparatus 3 includes the image sample obtaining unit 31, the character string obtaining unit 32, the vector conversion unit 33, the first learning unit 34, the classifier generation unit 35, the classifier output unit 36, the attribute sample obtaining unit 37, the second learning unit 38, and the table output unit 39. However, the classifier generation unit 35 according to the fourth embodiment (hereinafter, simply referred to as "classifier generation unit 35") has functions different from the classifier generation unit 35 according to the first, second, and third embodiments. Details of the classifier generation unit 35 are described later.

Processes of the units configured to function in the learning apparatus 3 are performed by hardware such as an ASIC or FPGA incorporated in the learning apparatus 3 or software using a memory such as a RAM and a processor such as a CPU. Specifically, for example, the learning apparatus 3 is formed of the computer illustrated as an example in FIG. 2B-2. Since the image input apparatus 2 according to the fourth embodiment (hereinafter, simply referred to as "image input apparatus 2") is the same as the image input apparatus 2 according to the first, second, or third embodiment, description thereof is omitted. Moreover, since the information processing apparatus 4 according to the fourth embodiment (hereinafter, simply referred to as "information processing apparatus 4") is the same as the information processing apparatus 4 according to the first or second embodiment, description thereof is omitted.

Figure 16A:
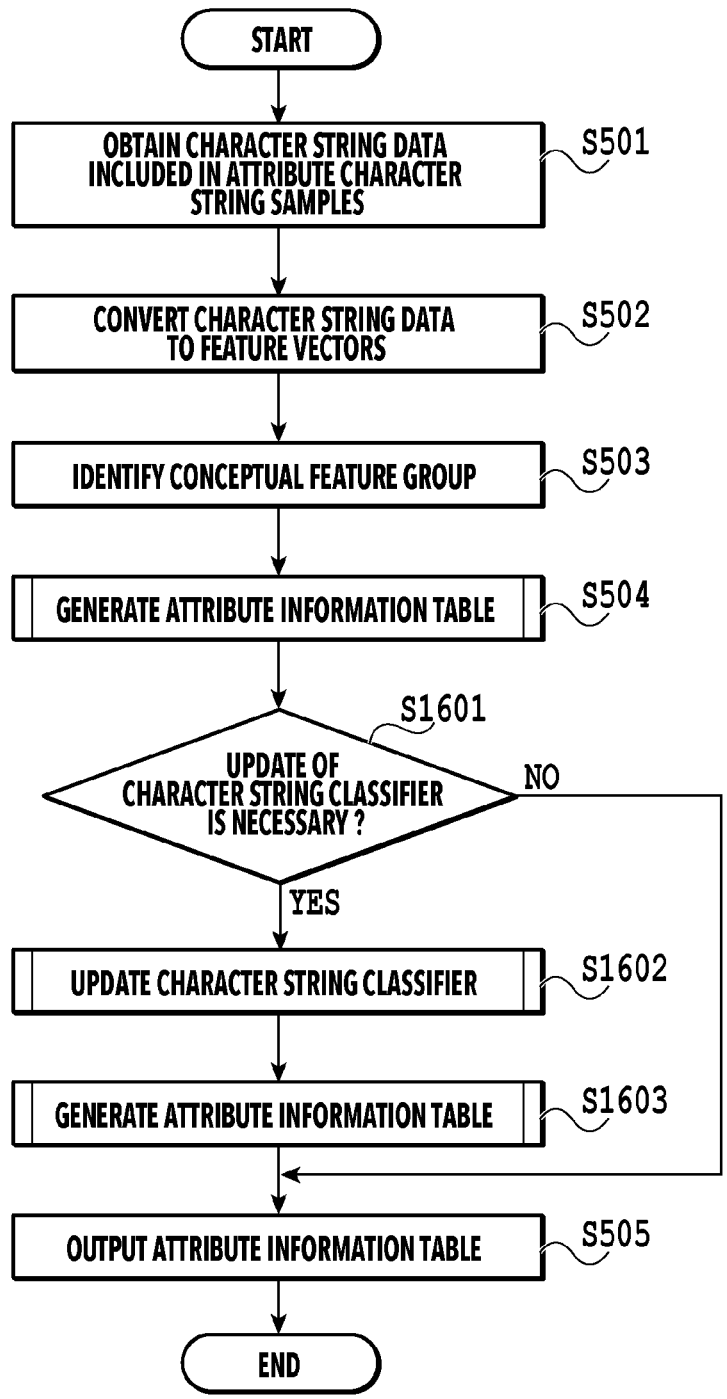
FIGS. 16A and 16B are flowcharts illustrating a flow example of a part of a process in the learning apparatus according to the fourth embodiment.
Figure 16B:
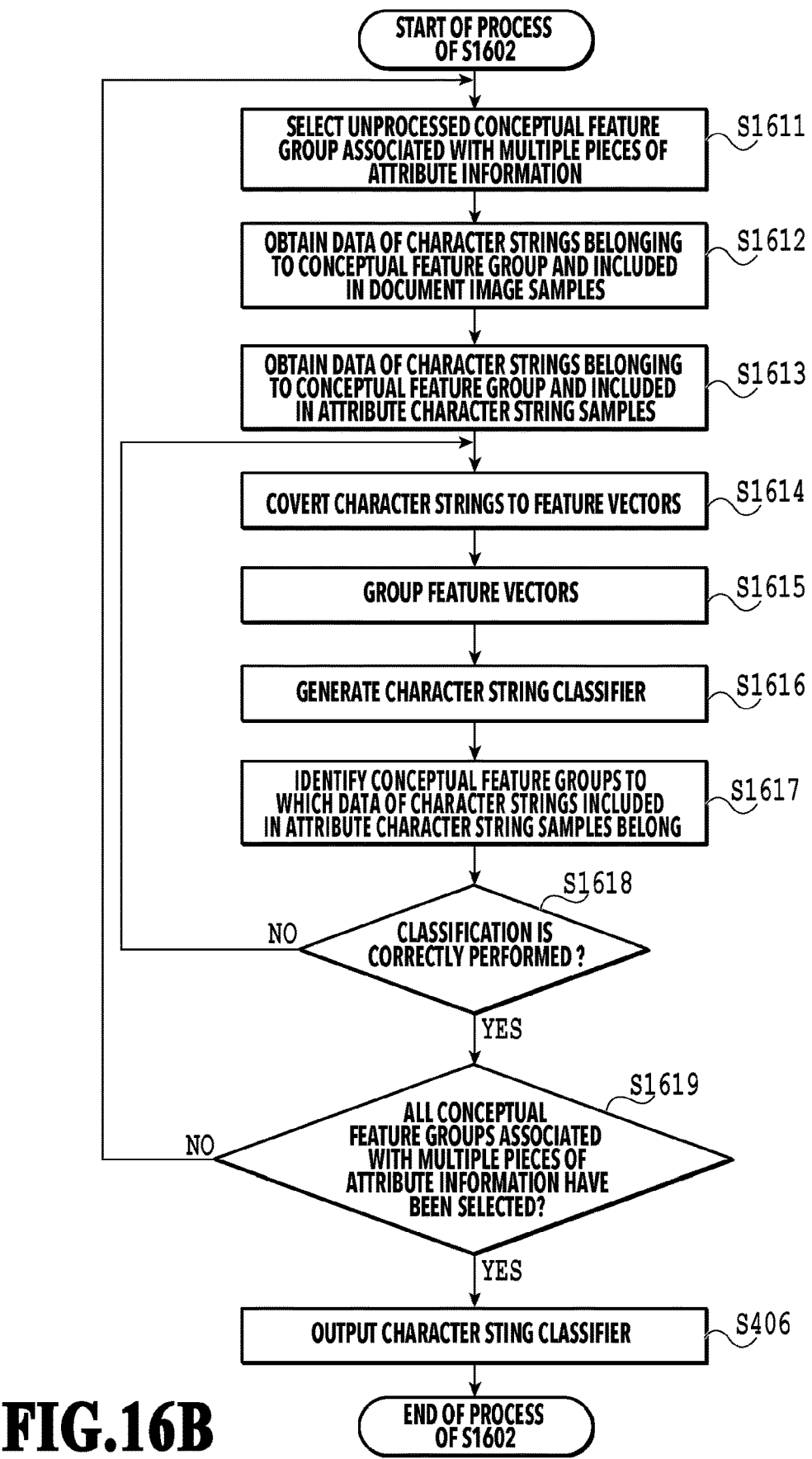

A flow of a process in which the learning apparatus 3 generates or updates the character string classifier 15 and the attribute information table 18 is described with reference to FIGS. 16A and 16B. FIGS. 16A and 16B are flowcharts illustrating an example of the flow of the process in which the learning apparatus 3 according to the fourth embodiment generates or updates the character string classifier 15 and the attribute information table 18. Note that, in the description of FIGS. 16A and 16B, reference sign "S" means step. Moreover, a program configured to execute each step illustrated in FIGS. 16A and 16B is stored in the ROM 232, the RAM 234, or the storage 235 of the learning apparatus 3 and is executed by the CPU 231 or the GPU 239 of the learning apparatus 3. For FIGS. 16A and 16B, description is given below of only the steps that are different from the processes in the learning apparatus 3 according to the first, second, or third embodiment. Moreover, detailed description of the steps denoted in FIGS. 16A and 16B by the same reference signs as those in the FIGS. 4, 5A, and 5B is omitted.

First, the learning apparatus 3 according to the fourth embodiment (hereinafter, simply referred to as "learning apparatus 3") executes the processes of S501 to S504. Since the processes of S501 to S504 are the same as the processes of the learning apparatus 3 according to the first embodiment, description thereof is omitted. Note that, in this example, it is assumed that the attribute character string samples 17 illustrated in FIG. 8C are defined and, in S504, the attribute information table 18 illustrated in FIG. 9C is generated as in the third embodiment. After S504, in S1601, the learning apparatus 3 determines whether update of the character string classifier 15 is necessary or not. The determination is performed by, for example, the second learning unit 38. For example, the second learning unit 38 checks whether multiple pieces of attribute information are associated with one conceptual feature group in the attribute information table generated in S504 and, in the case where there is at least one conceptual feature group associated with multiple pieces of attribute information, determines that the update is necessary. In the case where the second learning unit 38 determines that the update of the character string classifier 15 is necessary in S1601, in S1602, the learning apparatus 3 performs a process of updating the character string classifier 15.

The process of updating the character string classifier 15 is described with reference to FIG. 16B. FIG. 16B is a flowchart illustrating a flow example of a process in S1602 illustrated in FIG. 16A. First, in S1611, the classifier generation unit 35 selects one unprocessed conceptual feature group from among the conceptual feature groups associated with multiple pieces of attribute information. Specifically, for example, the classifier generation unit 35 selects the conceptual feature group 1117 associated with the two pieces of attribute information of "beverage" and "alcohol".

Next, in S1612, the CPU 231 obtains data of character strings classified into the selected conceptual feature group from among the pieces of data of character strings included in the document image samples 14. Specifically, for example, the CPU 231 obtains character string data belonging to the conceptual feature group 1117 illustrated as an example in FIG. 11B from among the pieces of data of character strings included in the document image samples 14. Note that, for example, the document image samples 14 described herein are obtained by saving the document image samples 14 obtained in S401 illustrated in FIG. 4 in the storage 235 and reading the saved document image samples 14 from the storage 235 in S1612.

Next, in S1613, the second learning unit 38 obtains character string data classified into the selected conceptual feature group from among the pieces of character string data included in the attribute character string samples 17. Specifically, for example, the second learning unit 38 obtains a character string set included in the conceptual feature group 1117 illustrated in FIG. 11C from among the pieces of character string data included in the attribute character string samples 17. Note that, for example, the attribute character string samples 17 described herein are obtained by saving the attribute character string samples 17 obtained in S501 illustrated in FIG. 5A in the storage 235 and reading the saved attribute character string samples 17 from the storage 235 in S1613.

Next, in S1614, the vector conversion unit 33 converts each of the character strings obtained in S1612 into a feature vector. Then, in S1615, the first learning unit 34 groups the feature vectors into multiple conceptual feature groups by using the aforementioned clustering method. In this case, for example, the number of conceptual feature groups into which the feature vectors are to be grouped is determined based on the number of pieces of attribute information associated with the conceptual feature group selected in S1611. Specifically, for example, since the conceptual feature group 1117 is associated with the two pieces of attribute information, the feature vectors only need to be grouped into two conceptual feature groups for the conceptual feature group 1117. Next, in S1616, the classifier generation unit 35 generates the character string classifier 15 that reproduces results of hierarchical grouping for all conceptual feature groups including the conceptual feature groups for which the grouping is performed in S1615. Then, in S1617, the second learning unit 38 identifies again the conceptual feature group to which each of the pieces of character string data included in the attribute character string samples 17 obtained in S1613 belongs, by using the character string classifier 15 generated in S1616. Note that, in the process of S1617, first, the vector conversion unit 33 converts each of the pieces of character string data included in the attribute character string samples 17 obtained in S1613, to a feature vector. Then, the second learning unit 38 inputs the converted feature vector into the character string classifier 15 generated in S1616 to identify the conceptual feature group to which the character string data belongs.

Figures 17A, 17B:
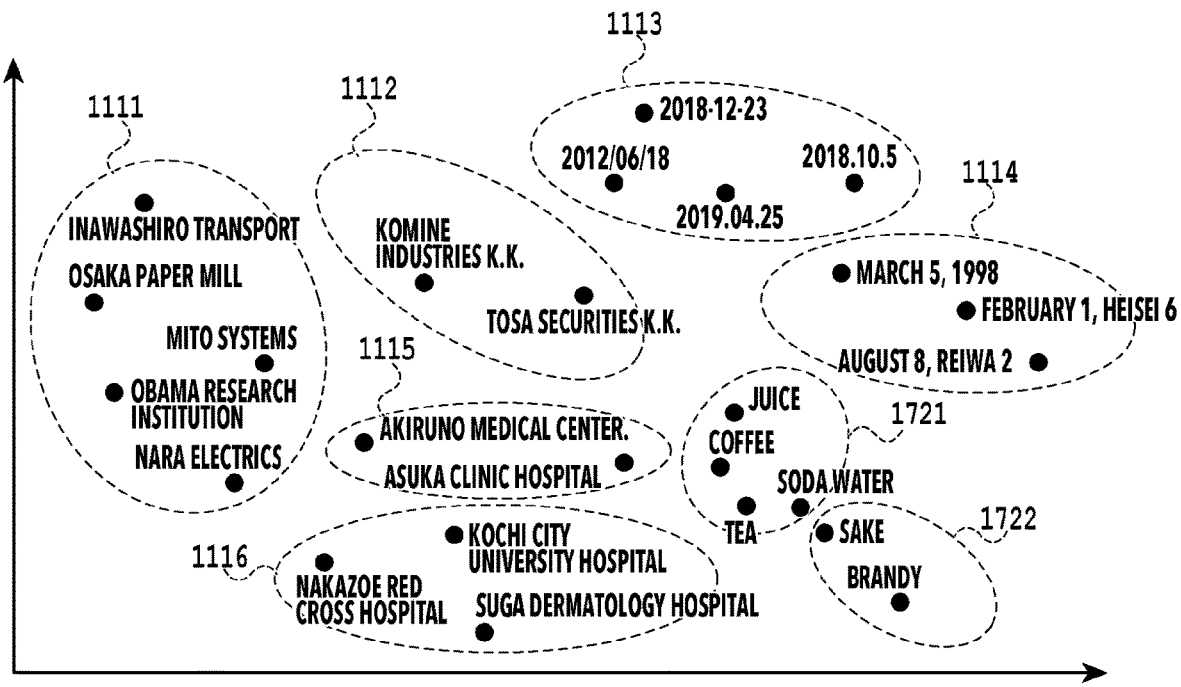
FIG. 17A is an explanatory diagram for explaining an example of relationships between the conceptual feature groups and the pieces of character string data and FIG. 17B is an explanatory diagram for explaining an example of the attribute information table.

The conceptual feature groups into which the feature vectors are classified by using the character string classifier 15 generated in S1616 and the attribute information table 18 generated in S1603 to be described later are described with reference to FIGS. 17A and 17B. FIG. 17A is an explanatory view for explaining an example of relationships between the conceptual feature groups into which the feature vectors are classified by using the character string classifier 15 generated in S1616 and the feature vectors corresponding to the respective pieces of character string data obtained in S1612 and S1613. Specifically, FIG. 17A is a diagram in which the regions of the conceptual feature groups and the feature vectors corresponding to the respective pieces of character string data are converted to be dimensionally reduced to a two-dimensional plane and are visualized. FIG. 17B is described later. As illustrated in FIG. 17A, the conceptual feature group 1117 illustrated in FIGS. 11B and 11C are divided into two conceptual feature groups of a conceptual feature group 1721 and a conceptual feature group 1722.

Next, in S1618, the learning apparatus 3 determines whether each piece of character string data obtained in S1613 is correctly classified. This determination is performed by, for example, the second learning unit 38. This determination is performed by determining whether one piece of attribute information is associated with one conceptual feature group as a result of identifying the conceptual feature group to which each piece of character string data belongs in S1617. In the case where the learning apparatus 3 determines that the classification is not correctly performed in S1618, the learning apparatus 3 returns to S1614 and repeatedly executes the processes of S1614 to S1618 until the learning apparatus 3 determines that the classification has been correctly performed in S1618. In this case, since the character strings associated with the attribute information of "beverage" and the character strings associated with the attribute information of "alcohol" belong to the conceptual feature groups different from each other as illustrated in FIG. 17A, the learning apparatus 3 can determine that the classification has been correctly performed.

In the case where the learning apparatus 3 determines that the classification has been correctly performed in S1618, in S1619, the learning apparatus 3 determines whether all conceptual feature groups associated with multiple pieces of attribute information have been processed. This determination is performed by, for example, the second learning unit 38. In the case where the learning apparatus 3 determines that not all of the conceptual feature groups have been processed in S1619, that is an unprocessed conceptual feature group is left, the learning apparatus 3 returns to S1611 and continues the processes. The learning apparatus 3 repeatedly executes the processes of S1611 to S1619 until the learning apparatus 3 determines that all conceptual feature groups have been processed in S1619. In the case where the learning apparatus 3 determines that all conceptual feature groups have been processed in S1619, in S406, the classifier output unit 36 outputs the character string classifier 15 generated in S1602 to the information processing apparatus 4. Specifically, the classifier output unit 36 outputs the character string classifier 15 to the information processing apparatus 4 to update the character string classifier 15 saved in the storage 265 included in the information processing apparatus 4. After S406, the learning apparatus 3 terminates the processes of the flowchart illustrated in FIG. 16B and completes the process of S1602.

After S1602, in S1603, the learning apparatus 3 generates a new attribute information table 18 by using the character string classifier 15 updated in S1602. Note that, since the process of generating a new attribute information table in S1603 is the same as the process of S504, that is the process of the flowchart illustrated in FIG. 5B, description thereof is omitted. FIG. 17B is an explanatory view for explaining an example of the new attribute information table 18 generated in S1603. The conceptual feature group 1117 associated with the two pieces of attribute information in the attribute information table 18 illustrated in FIG. 9C is changed to the two conceptual feature groups 1721 and 1722 each associated with one piece of attribute information different from that of the other in FIG. 17B. After S1603, in S505, the table output unit 39 outputs the attribute information table 18 generated in S1603 to the information processing apparatus 4 to update the attribute information table 18 saved in the storage 265 included in the information processing apparatus 4. After S505, the learning apparatus 3 terminates the processes of the flowcharts illustrated in FIGS. 16A and 16B.

As described above, according to the information processing apparatus 4, the character string classifier 15 can be updated such that one piece of attribute information is associated with one conceptual feature group. As a result, the information processing apparatus 4 can efficiently extract candidate character strings having an attribute desired by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, character string data corresponding to an attribute desired by the user can be extracted, from an image of a document with a layout different from a fixed-form document having a predetermined layout, as a candidate of an item value corresponding to a predetermined item, also in the case where the item value is an item value of an item that is noted by irregular character strings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-148490, filed Sep. 13, 2021, which is hereby incorporated by reference wherein in its entirety.

What is claimed is:

1. An information processing apparatus that extracts a candidate character string to be a candidate of an item value corresponding to a predetermined item, from among a plurality of character strings included in a document image to be processed, the information processing apparatus comprising:
   one or more hardware processors; and
   one or more memories storing one or more programs configured to be executed by the one or more hardware processors, the one or more programs including instructions for:
      obtaining information on a conceptual feature group of a preset extraction target among a predetermined plurality of conceptual feature groups;
      obtaining an attribute information table in which each of the plurality of conceptual feature groups is associated in advance with attribute information indicating items of attribute groups;
      obtaining one or more conceptual feature groups associated with the same attribute information as the attribute information associated with the conceptual feature group of the extraction target, from among the plurality of conceptual feature groups as a conceptual feature group set based on the attribute information table;
      identifying the conceptual feature group to which each of the plurality of character strings belongs from among the plurality of conceptual feature groups based on a feature vector corresponding to each of the plurality of character strings, and extracting the character string whose identified conceptual feature group is the same as any of the conceptual feature groups in the conceptual feature group set, from among the plurality of character strings as the candidate character string; and
      outputting the extracted candidate character string.

2. The information processing apparatus according to claim 1, wherein
   the one or more programs further include an instruction for converting data of each of the plurality of character strings to the feature vector, wherein
   the conceptual feature group to which each of the plurality of character strings belongs is identified based on the converted feature vector corresponding to each of the plurality of character strings.

3. The information processing apparatus according to claim 1, wherein the attribute information table is generated by identifying the conceptual feature group to which each of character strings associated in advance respectively with a plurality of pieces of the attribute information belongs from among the plurality of conceptual feature groups, based on a feature vector corresponding to the character string associated with the attribute information, and by associating the identified conceptual feature group and one or more pieces of the attribute information associated with the character strings identified to belong to the identified conceptual feature group with each other.

4. The information processing apparatus according to claim 3, wherein the conceptual feature group to which each of the character strings associated respectively with the pieces of attribute information belongs is identified by using a classifier that classifies an inputted character string into one of the plurality of conceptual feature groups.

5. The information processing apparatus according to claim 1, wherein the conceptual feature group to which each of the plurality of character strings belongs is identified by using a classifier that classifies an inputted character string into one of the plurality of conceptual feature groups.

6. The information processing apparatus according to claim 5, wherein, in a case where the classifier classifies the inputted character string, a priority is given to the conceptual feature group into which the inputted character string is classified, based on a distance between a barycentric position of each of the plurality of conceptual feature groups and the feature vector corresponding to the inputted character string.

7. The information processing apparatus according to claim 4, wherein the classifier is generated based on a learned model generated by machine learning in which character strings included in a plurality of document images different from the document image to be processed are used as data for learning.

8. The information processing apparatus according to claim 7, wherein the classifier is generated based on a learned model generated by machine learning in which the character strings included in the plurality of document images are converted to the feature vectors, respectively, and the plurality of converted feature vectors are used as data for learning.

9. The information processing apparatus according to claim 3, wherein the attribute information table is generated by associating the identified conceptual feature group and one piece of representative attribute information among the one or more pieces of attribute information associated with the character strings identified to belong to the identified conceptual feature group.

10. The information processing apparatus according to claim 3, wherein a priority is given to the one or more pieces of attribute information associated with the character strings identified to belong to the identified conceptual feature group.

11. The information processing apparatus according to claim 6, wherein a high priority is given to the candidate character string identified to belong to the conceptual feature group with a high priority, based on the priority given to the conceptual feature group.

12. The information processing apparatus according to claim 10, wherein a high priority is given to the candidate character string identified to belong to the conceptual feature group associated with the attribute information with a high priority, based on the priority given to the attribute information.

13. The information processing apparatus according to claim 1, wherein
the one or more programs further include an instruction for setting the conceptual feature group of the extraction target, wherein
based on the feature vector corresponding to a character string designated from among one or more second character strings included in a document image different from the document image to be processed, the conceptual feature group to which the designated character string belongs is identified from among the plurality of conceptual feature groups, and the identified conceptual feature group to which the designated character string belongs is set as the conceptual feature group of the extraction target, and
information indicating the set conceptual feature group of the extraction target is obtained.

14. The information processing apparatus according to claim 13, wherein
the one or more programs further include an instruction for converting data of each of the character strings into the feature vector, wherein
the designated character string among the one or more second character strings included in the document image used to set the conceptual feature group of the extraction target is converted to the feature vector, and
the conceptual feature group to which the designated character string belongs is identified based on the converted feature vector corresponding to the designated character string.

15. The information processing apparatus according to claim 13, wherein the conceptual feature group to which the designated character string belongs is identified by using a classifier that classifies an inputted character string into one of the plurality of conceptual feature groups.

16. The information processing apparatus according to claim 15, wherein the classifier is generated based on a learned model generated by machine learning in which character strings included in a plurality of document images different from the document image to be processed are used as data for learning.

17. The information processing apparatus according to claim 15, wherein the classifier is generated based on a learned model generated by machine learning in which the character strings included in the plurality of document images are converted to the feature vectors, respectively, and the plurality of converted feature vectors are used as data for learning.

18. A non-transitory computer readable storage medium storing a program for causing a computer to perform a control method of an information processing apparatus that extracts a candidate character string to be a candidate of an item value corresponding to a predetermined item, from among a plurality of character strings included in a document image to be processed, the control method comprising the steps of:
obtaining information on a conceptual feature group of a preset extraction target among a predetermined plurality of conceptual feature groups;
obtaining an attribute information table in which each of the plurality of conceptual feature groups is associated in advance with attribute information indicating items of attribute groups;
obtaining one or more conceptual feature groups associated with the same attribute information as the attribute information associated with the conceptual feature group of the extraction target, from among the plurality of conceptual feature groups as a conceptual feature group set based on the attribute information table;

identifying the conceptual feature group to which each of the plurality of character strings belongs from among the plurality of conceptual feature groups based on a feature vector corresponding to each of the plurality of character strings, and extracting the character string whose identified conceptual feature group is the same as any of the conceptual feature groups in the conceptual feature group set, from among the plurality of character strings as the candidate character string; and outputting the extracted candidate character string.

19. An information processing method of extracting a candidate character string to be a candidate of an item value corresponding to a predetermined item, from among a plurality of character strings included in a document image to be processed, the information processing method comprising the steps of:

obtaining information on a conceptual feature group of a preset extraction target among a predetermined plurality of conceptual feature groups;

obtaining an attribute information table in which each of the plurality of conceptual feature groups is associated in advance with attribute information indicating items of attribute groups;

obtaining one or more conceptual feature groups associated with the same attribute information as the attribute information associated with the conceptual feature group of the extraction target, from among the plurality of conceptual feature groups as a conceptual feature group set based on the attribute information table;

identifying the conceptual feature group to which each of the plurality of character strings belongs from among the plurality of conceptual feature groups based on a feature vector corresponding to each of the plurality of character strings, and extracting the character string whose identified conceptual feature group is the same as any of the conceptual feature groups in the conceptual feature group set, from among the plurality of character strings as the candidate character string; and outputting the extracted candidate character string.

20. A learning apparatus comprising:

one or more hardware processors; and one or more memories storing one or more programs configured to be executed by the one or more hardware processors, the one or more programs including instructions for:

causing a learning model before learning or in the middle of learning to learn grouping of feature vectors into a plurality of conceptual feature groups while using the feature vectors corresponding respectively to character strings included in a plurality of document images as data for learning;

generating a classifier that classifies an inputted character string into one of the plurality of conceptual feature groups, by using a learned model that is a learning result of the learning; and identifying the conceptual feature group to which each of character strings associated in advance respectively with a plurality of pieces of attribute information belongs by using the classifier, and generating an attribute information table in which each of the identified conceptual feature groups and one or more pieces of the attribute information associated with the character strings identified to belong to the identified conceptual feature group are associated with each other;

outputting the generated classifier; and outputting the generated attribute information table.

21. The learning apparatus according to claim 20, wherein, the learning apparatus generates the classifier that, in a case where the classifier classifies the inputted character string, gives a priority to the conceptual feature group into which the inputted character string is classified, based on a distance between a barycentric position of each of the plurality of conceptual feature groups and the feature vector corresponding to the inputted character string.

22. The learning apparatus according to claim 20, wherein the learning apparatus generates the attribute information table by associating the identified conceptual feature group and one piece of representative attribute information among the one or more pieces of attribute information associated with the character strings identified to belong to the identified conceptual feature group.

23. The learning apparatus according to claim 20, wherein the learning apparatus generates the attribute information table in which a priority is given to the one or more pieces of attribute information associated with the character strings identified to belong to the conceptual feature group.

24. The learning apparatus according to claim 20, wherein, in the case where there is the conceptual feature group associated with a plurality of pieces of attribute information in the generated attribute information table, the learning apparatus regenerates the classifier by dividing the conceptual feature group into a plurality of conceptual feature groups based on the number of pieces of attribute information associated with the conceptual feature group.

* * * * *